US012650742B2

(12) United States Patent
Asthana et al.

(10) Patent No.: US 12,650,742 B2
(45) Date of Patent: Jun. 9, 2026

(54) INTERACTIVE DISPLAY SURFACES

(71) Applicant: Touchwood Labs, Inc., Exeter, NH (US)

(72) Inventors: Gaurav Asthana, Brooklyn, NY (US); Matthew Dworman, Exeter, NH (US)

(73) Assignee: Touchwood Labs, Inc., Exeter, NH (US)

( * ) Notice: Subject to any disclaimer, the term of this patent is extended or adjusted under 35 U.S.C. 154(b) by 0 days.

(21) Appl. No.: 18/810,402

(22) Filed: Aug. 20, 2024

(65) Prior Publication Data

US 2024/0411394 A1 Dec. 12, 2024

Related U.S. Application Data

(63) Continuation-in-part of application No. 18/200,246, filed on May 22, 2023, now Pat. No. 12,067,183, which is a continuation of application No. 17/567,941, filed on Jan. 4, 2022, now Pat. No. 11,656,708, which is a continuation of application No. 17/169,192, filed on Feb. 5, 2021, now Pat. No. 11,216,102.

(60) Provisional application No. 62/970,255, filed on Feb. 5, 2020.

(51) Int. Cl.
| | |
|---|---|
| *G06F 3/041* | (2006.01) |
| *A47B 97/00* | (2006.01) |
| *G06F 3/044* | (2006.01) |

(52) U.S. Cl.
CPC ............ *G06F 3/0412* (2013.01); *A47B 97/00* (2013.01); *G06F 3/0446* (2019.05); *A47B 2220/0091* (2013.01)

(58) Field of Classification Search
CPC ..... G06F 3/0412; G06F 3/0446; A47B 97/00; A47B 2220/0091
See application file for complete search history.

(56) References Cited

U.S. PATENT DOCUMENTS

| | | | |
|---|---|---|---|
| 10,545,616 B2 * | 1/2020 | Wang ................. | G06V 40/1318 |
| 11,061,475 B2 * | 7/2021 | Galan Garcia ........ | B60K 35/22 |
| 2016/0162093 A1 | 6/2016 | Kim et al. | |
| 2017/0010746 A1 | 1/2017 | Hotelling et al. | |
| 2017/0059875 A1 | 3/2017 | Seung et al. | |
| 2017/0345323 A1 | 11/2017 | Martinez Sanchez et al. | |
| 2018/0210571 A1 * | 7/2018 | Wang .................... | H10K 59/13 |
| 2019/0135199 A1 * | 5/2019 | Galan Garcia ........ | B60K 35/10 |
| 2019/0212843 A1 | 7/2019 | Reese et al. | |

(Continued)

FOREIGN PATENT DOCUMENTS

| | | |
|---|---|---|
| KR | 20160001123 A | 1/2016 |
| WO | 2018029442 A1 | 2/2018 |

*Primary Examiner* — Peter D McLoone

(74) *Attorney, Agent, or Firm* — Lisa E. Geary; Eckert Seamans Cherin & Mellott LLC

(57) ABSTRACT

Touch responsive displays that may be integrated into a wide variety of non-transparent surfaces to provide on-demand human computer interfaces that blend with the environment, i.e., remain invisible unless activated, effectively adding digital user interfaces (UI) to non-technology products and surfaces. The interactive display devices are frameless assemblies of a sensor layer, a light layer, and a support layer housing a microcontroller, wherein the device is configured to be positioned beneath a non-transparent surface layer with the sensor or light layer arranged below the surface layer.

21 Claims, 29 Drawing Sheets

(56)        References Cited

U.S. PATENT DOCUMENTS

2020/0241675  A1      7/2020   Oki et al.
2020/0369223  A1     11/2020   Hansen et al.

* cited by examiner

14a

14c

12

← Non-transparent surface layer

← Y – grid conductive wires

14b

← Electrically insulating polymer

← X – grid conductive wires

16

← Insulation layer

14a

14b

14c

12

← Non-transparent surface layer

← Y – grid conductive wires

← Electrically insulating polymer

← X – grid conductive wires

16/18a

← Insulation layer

← Micro-lenses

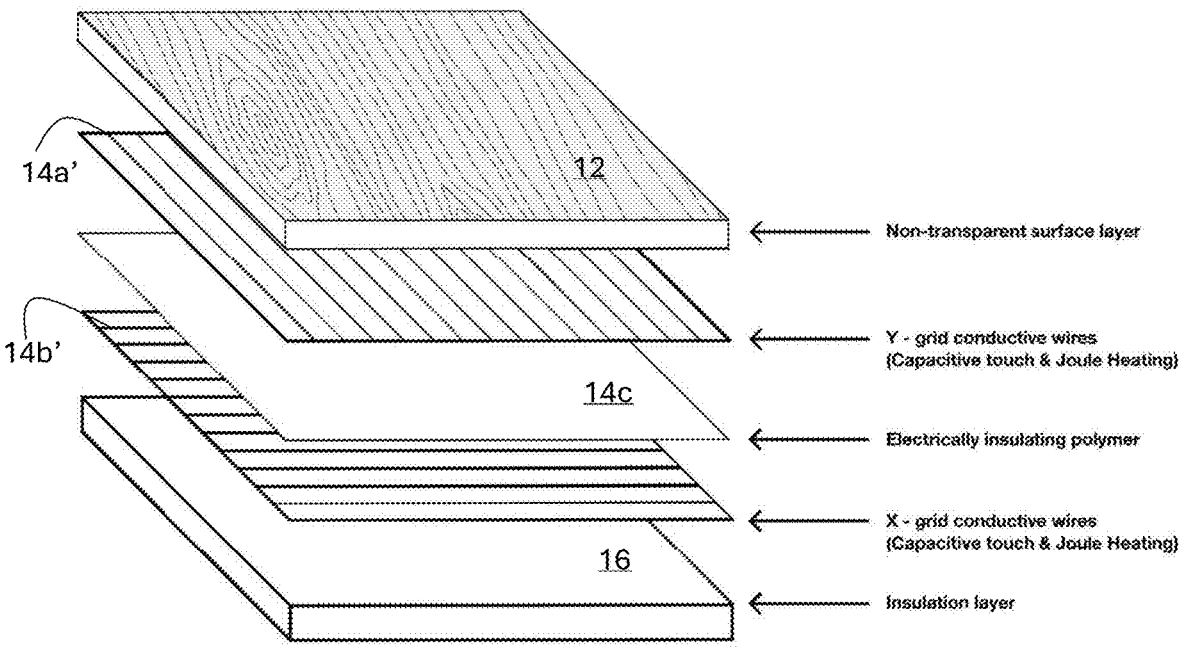

14a'

14b'

12

14c

16

Non-transparent surface layer

Y - grid conductive wires
(Capacitive touch & Joule Heating)

Electrically insulating polymer

X - grid conductive wires
(Capacitive touch & Joule Heating)

Insulation layer

FIG. 2E

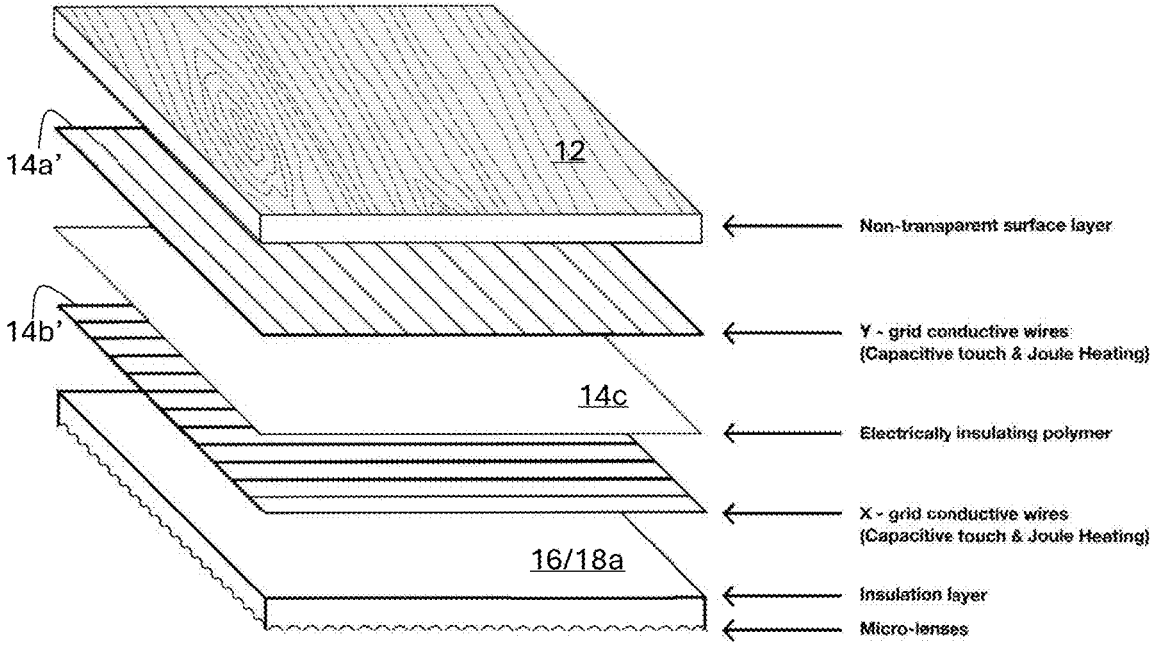

14a'

14b'

12

14c

16/18a

Non-transparent surface layer

Y - grid conductive wires
(Capacitive touch & Joule Heating)

Electrically insulating polymer

X - grid conductive wires
(Capacitive touch & Joule Heating)

Insulation layer

Micro-lenses

500 here 900a    904    904

Photodiode in Sensing Mode ——  —— Photodiode in Emitting Mode

—— Photodiode in Emitting Mode

—— Photodiode in Emitting Mode

—— Photodiode in Emitting Mode

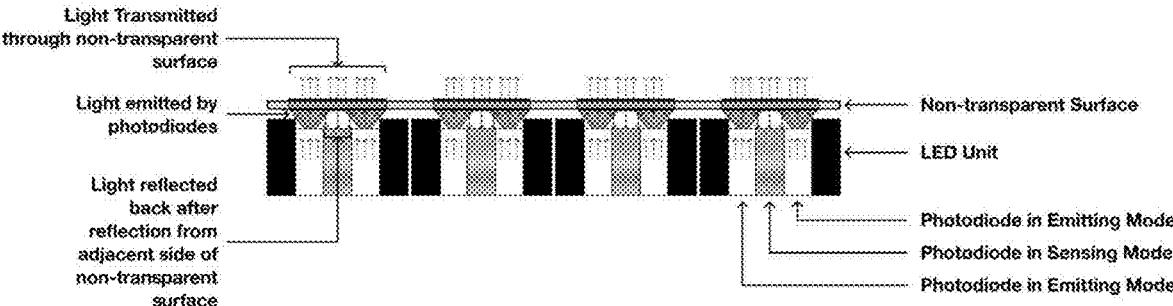

Light Transmitted through non-transparent surface

Light emitted by photodiodes

Light reflected back after reflection from adjacent side of non-transparent surface Non-transparent Surface LED Unit Photodiode in Emitting Mode
Photodiode in Sensing Mode
Photodiode in Emitting Mode

FIG. 17A

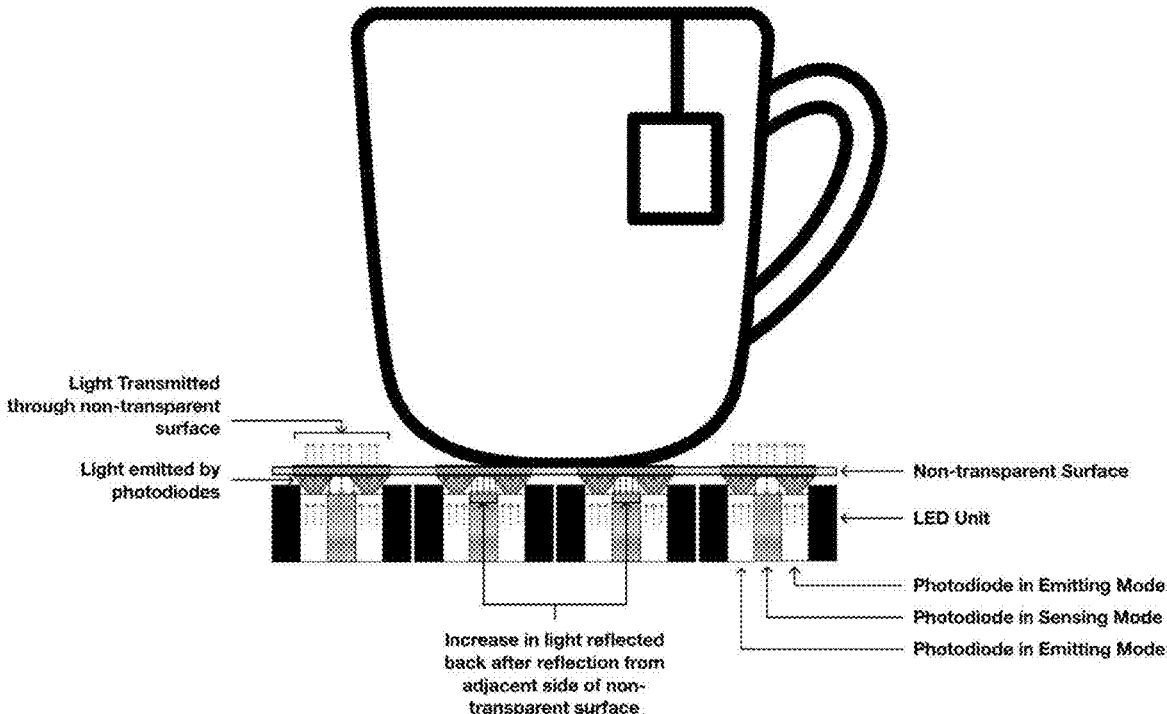

Light Transmitted through non-transparent surface

Light emitted by photodiodes

Non-transparent Surface

LED Unit

Photodiode in Emitting Mode
Photodiode in Sensing Mode
Photodiode in Emitting Mode Increase in light reflected back after reflection from adjacent side of non-transparent surface

FIG. 17B

INTERACTIVE DISPLAY SURFACES

CROSS-REFERENCE TO RELATED APPLICATIONS

The present application is a continuation-in-part of U.S. patent application Ser. No. 18/200,246, filed May 22, 2023, issued as U.S. Pat. No. 12,067,183 on Aug. 20, 2024, which is a continuation of U.S. patent application Ser. No. 17/567, 941, filed Jan. 4, 2022, issued as U.S. Pat. No. 11,656,708 on May 23, 2023, which is a continuation of U.S. patent application Ser. No. 17/169,192, filed Feb. 5, 2021, issued as U.S. Pat. No. 11,216,102 on Jan. 4, 2022, which claims the benefit of priority under 35 U.S.C. § 119(e) of prior U.S. Provisional Application Ser. No. 62/970,255, filed Feb. 5, 2020, the entire contents of which are incorporated herein.

FIELD OF THE INVENTION

The present disclosure is directed to interactive display surfaces, and more specifically to non-transparent surfaces being given abilities to serve as digital information displays with touch and proximity sensing capabilities.

DESCRIPTION OF THE RELATED ART

Touch screen technology provides a human computer interface that enables the user to provide input to and receive output from a processing unit. In recent years, touch screens, which are also referred to as touch panels, touch-enabled computer displays, touch-enabled computer screens, touch-screens, touch displays, touch pads, etc. (hereinafter collectively referred to as "touch screen(s)"), are being incorporated into numerous electronic devices including mobile phones, tablets, computers, and laptops. This widespread use is attributable, in part, to the intuitive experience that touch screens provide as a result of their natural and unobtrusive integration into technology and our environments.

As touch screen technologies grow in their capabilities and uses, they are being incorporated into a greater number and range of devices and locations. The use of such technology is expected to grow not only in personal devices, but also in residential, commercial, health care, retail, and education fields and environments. The flood of information that is being channeled through these interactive devices, however, is often overwhelming and unsustainable, leading to disruptions of sleep, attention span, and a drop in productivity and social interaction. In response, there is an increasing desire to make touch screens blend seamlessly into their environment without sacrificing esthetic.

Most touch screen technologies require the screen, or surface of the device or surface into which they are incorporated, to be glass or another transparent material. There is a market demand for the creation of touch screen technology that can be incorporated into surfaces that are not glass. For example, WO 2019/082399 and WO 2019/083051 describe touch responsive display panels that are provided with a wood veneer surface. While providing for improved integration with the environment, such panels require a frame and multiple layers, e.g., several air gaps and a light guide, that significantly increase the overall dimensions of the panel and decrease the display area. Moreover, such panels are capable of only limited display quality and range, reducing the types of content that may be provided thereon.

There remains a need for improved display panels that may blend seamlessly with the environment and are capable of a full range of display capabilities. The devices and methods of the present disclosure address this need.

SUMMARY

The present disclosure provides an interactive display device having a frameless outer perimeter, a top surface, and a bottom surface, wherein the device comprises several layers including at least a sensor layer and a light layer comprising a plurality of light elements that extend to the outer perimeter of the interactive display device and are configured to render digital information. The device further comprises a support layer arranged beneath the light layer, the support layer providing rigidity to the device and forming the bottom surface of the device.

The device comprises a microcontroller that generally includes a processor configured to execute computer-executable instructions, a memory storing the computer-executable instructions, and a wireless transceiver circuit in communication with the processor, wherein the processor is configured to receive signals related to a touch position on the top surface of the device and generate responsive output signals corresponding to the digital information to be rendered by the light layer. Moreover, the wireless transceiver circuit may receive and transmit wireless communication signals via a wireless network comprising the digital information to be rendered by the light layer. The microcontroller may be positioned between the light layer and the support layer, such as in a recess on the support layer configured to accommodate the microcontroller.

The plurality of light elements of the light layer may be arranged in a grid. The plurality of light elements may be independently powered. Exemplary light elements include at least LED, OLED, and fiber optic lighting. For example, the plurality of light elements may be a red-green-blue light emitting diode (RGB LED) or a red-green-blue-white light emitting diode (RGBW LED).

The sensor layer may comprise a capacitive touch sensor configured to generate an input signal related to a touch position on the sensor layer, and an electronic input-output control system configured to receive the input signal and generate a responsive output signal receivable by the processor. The capacitive touch sensor may comprise a conductive material arranged on a surface of a substrate, and a plurality of electrodes electrically coupled to the conductive material and spaced apart at predetermined intervals. The conductive material may comprise metal nanowires or traces arranged in an x-y grid. In one configuration, the sensor layer comprises a set of parallel conductive traces or wires arranged on a top surface of a substrate in a first direction and a second set of parallel conductive wires or traces arranged on a bottom surface of the substrate on a second direction substantially 90° to the first direction. The second set of conductive wires or traces may be in direct contact with an insulation layer or light guide, and the first set of conductive wires or traces may be in direct contact with an underside of a non-transparent surface layer.

In configurations that include a capacitive touch sensor layer, the conductive material in the touch sensor layer may be configured to sense and heat. That is, the sensor layer may have a (i) heating mode that generates heat through Joule heating when a current is applied, wherein the amount of heat generated is controlled by adjusting the current supplied to the nanowires, and (ii) and a touch sensing mode configured to detect touch inputs by forming a capacitive network with a plurality of electrodes, wherein the capacitance is sensitive to proximity or contact of a conductive object. The interactive display may be configured to rapidly switch between the heating mode and the touch sensing mode, wherein during the heating mode, current is applied to the conductive material to generate heat while temporarily suspending touch sensing, and during the sensing mode, the current is reduced or ceased, allowing the conductive material to function as part of the capacitive touch sensor.

The device may further comprise a substantially transparent insulation layer arranged between the sensor and light layers. The insulation layer may comprise a lens positioned above each of the plurality of light elements, wherein the lenses are formed as recesses or protrusions in the insulation layer and focus or diffuse light from the light elements. The plurality of light elements may be arranged in a grid having a pitch of 0.20 mm to 5 mm, and a thickness of the insulation layer may be equal to or greater than 0.25× the pitch of the grid.

The sensor layer may alternatively be provided by the light elements. For example, the light layer may be arranged on an underside of a non-transparent surface layer and include a plurality of light elements configured to render digital information as noted above, and also may sense for touch and proximity inputs. That is, each light element of the plurality of light elements may individually comprise photodiodes, wherein the one photodiode having the longest wavelength is configured to operate in a sensing mode, i.e., sensing photodiode, and the remaining photodiodes are configured to operate in an emitting mode, i.e., emitting photodiodes. The emitting photodiodes are configured to render the digital information, and the sensing photodiode is configured to sense a light intensity. Thus, light emitted by the emitting photodiodes that is reflected back to the sensing photodiode by the underside of the non-transparent surface layer provides the touch and proximity sensing, and further may provide for the ability to differentiate between the presence and absence of objects placed on a top surface of the non-transparent surface layer (i.e., opposite from the underside thereof). In this configuration, the device may comprise a light guide having lenses and/or an insulation layer, or neither the light guide and the insulation layer.

The processor of the microcontroller may be further configured to receive input signals from the sensing photodiode in each of the individual light elements to determine the presence and position of objects proximate to or placed on the top surface of the non-transparent surface layer and generate responsive output signals to the emitting photodiodes in each of the individual light elements corresponding to digital information to be rendered on the light layer and visible through the non-transparent surface layer, The processor of the microcontroller may be further yet configured to monitor operation of the plurality of light elements and detect electrical interference generated by active light elements, use an AI model to distinguish between genuine touch inputs and the electrical interference caused by the active light elements, and relay information about the active light elements to the touch sensor to dynamically adjust a sensitivity or calibration settings of the touch sensor to isolate the electrical interference from the genuine touch inputs.

The device may further comprise a non-transparent surface layer, wherein the layers of the device are not visible beneath the non-transparent surface layer when the light layer is inactive, and when the light layer is active, such as responsive to a signal from the sensor layer, may show the digital information. The surface layer and sensor layer may be bonded together with a transparent bonding material. The non-transparent surface layer generally comprises a material selected from the group consisting of wood, fiber, stone, leather, Corian®, quartz®, polymers, ceramics, alloys, vinyl, opaque acrylics, plastics, and composite materials.

The present disclosure also provides a piece of furniture having the interactive display device embedded on a surface thereof, wherein the sensor layer is arranged below and bonded to a non-transparent surface veneer of the piece of furniture such that the device blends with the surface when the light layer is inactive.

The present disclosure also provides an architectural element having the interactive display device embedded on a surface thereof, wherein the sensor layer is arranged below and bonded to a non-transparent surface of at least a portion of the architectural element such that the device blends with the surface when the light layer is inactive.

The present disclosure also provides an interior cabin panel of a vehicle having the interactive display device embedded on a surface thereof, wherein the sensor layer is arranged below and bonded to a non-transparent surface constituting at least a portion of the panel such that the device blends with the surface when the light layer is inactive, and wherein the interactive display device provides control information for the vehicle and control of cabin and vehicle control functionality.

The present disclosure also provides an appliance having the interactive display device embedded therein, wherein the sensor layer is arranged below and bonded to a non-transparent surface constituting at least a portion of the appliance such that the device blends with the surface when the light layer is inactive, and wherein the interactive display device functions as a control pad to operate the given appliance, keypad, security panel, home control panel, interactive visualizer, interactive whiteboard, digital art display or interactive digital art display.

The present disclosure also provides a wall, floor, panel, or door having the interactive display device embedded therein, wherein the sensor layer is arranged below and bonded to a non-transparent surface constituting at least a portion of the wall, floor, panel, or door such that the device blends with the surface when the light layer is inactive, and when the light layer is active, such as responsive to a signal from the touch sensor layer, may show the digital information.

The present disclosure also provides a method for providing digital information on a non-transparent surface using any of the interactive display devices disclosed herein. The method generally comprises positioning a sensor layer of an interactive display device below the non-transparent surface, and providing the digital information responsive to a touch contact on the non-transparent surface at a position over the sensor layer of the device, wherein the processor of the microcontroller is configured to receive signals related to the position and generate responsive output signals corresponding to the digital information to be rendered on the light layer. The digital information may be any of an image, a text, a light, a pattern, or a combination thereof. The non-transparent surface may be part of a piece of furniture, a wall, a floor, a door, a motor vehicle, a transit vehicle, or a decorative element.

BRIEF DESCRIPTION OF THE DRAWINGS

A better understanding of the devices and methods of the present disclosure will be had upon reference to the following detailed description when read in conjunction with the accompanying drawings, wherein like numerals represent like features in the various views. It is to be noted that features and components in these drawings, illustrating views of embodiments of the devices of the present disclosure, unless stated to be otherwise, are not necessarily drawn to scale.

Figure 1A:
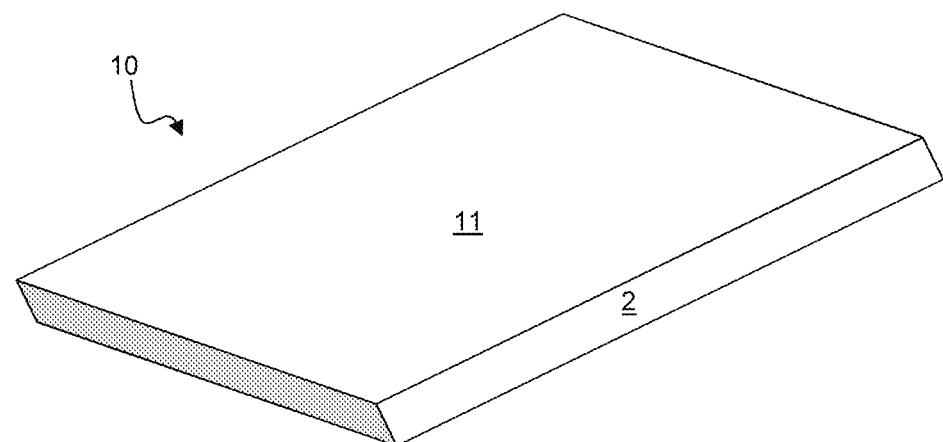
Figure 1B:
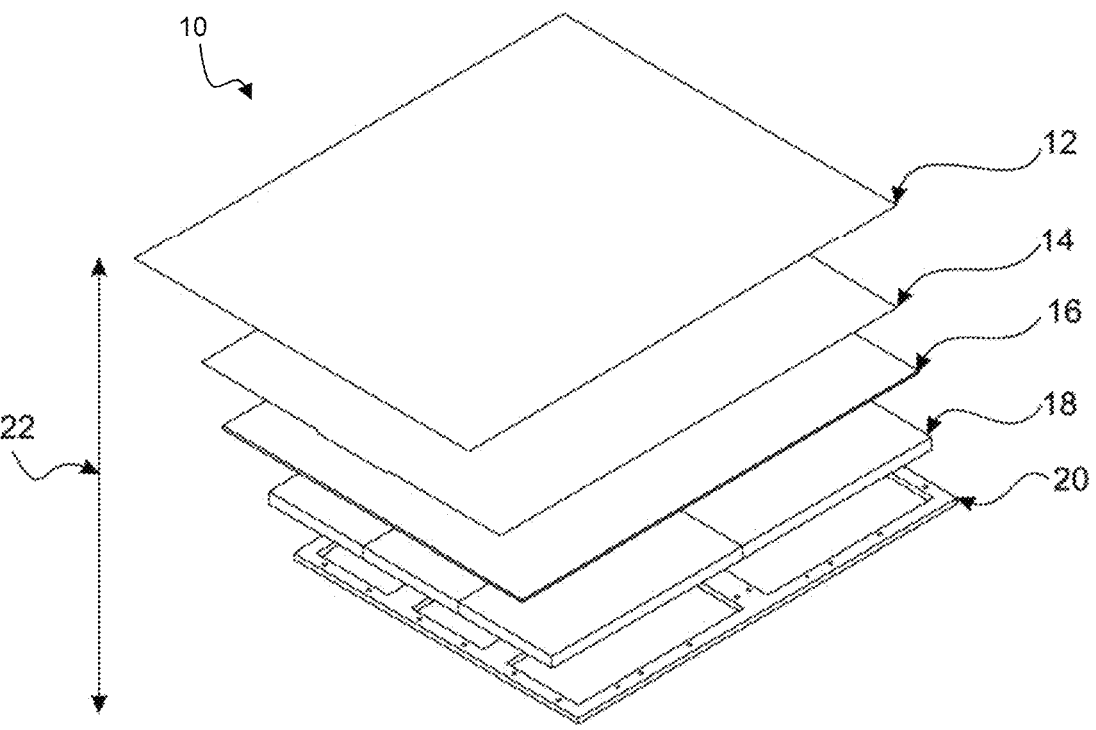

FIGS. 1A and 1B illustrate an interactive display device and exploded layers of the device, respectively, according to aspects of the present disclosure.

FIGS. 2A-2G illustrate exploded layers of an interactive display according to aspects of the present disclosure.

Figure 3:
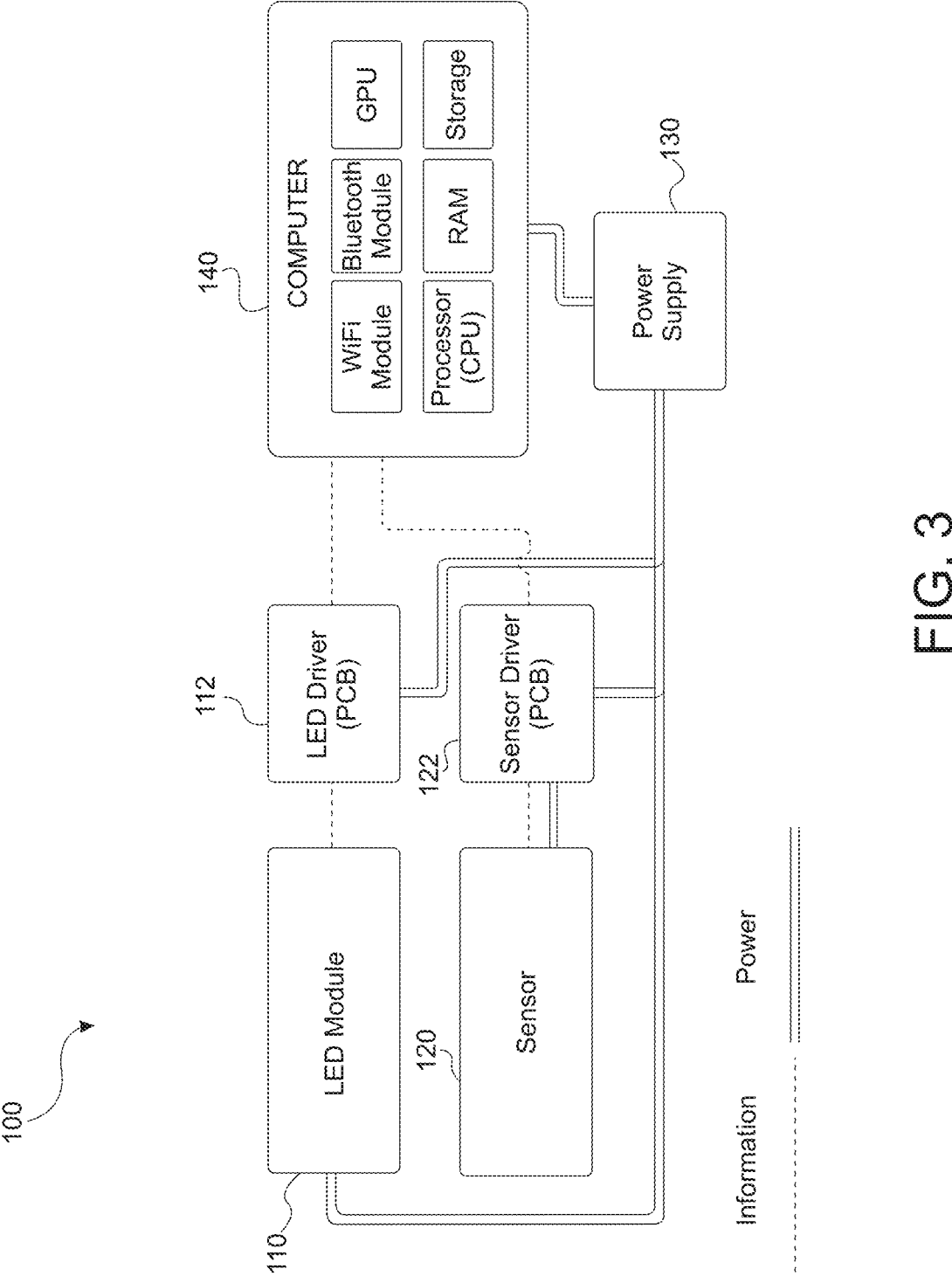

FIG. 3 illustrates a wiring diagram of an interactive display according to the present disclosure.

Figure 4:
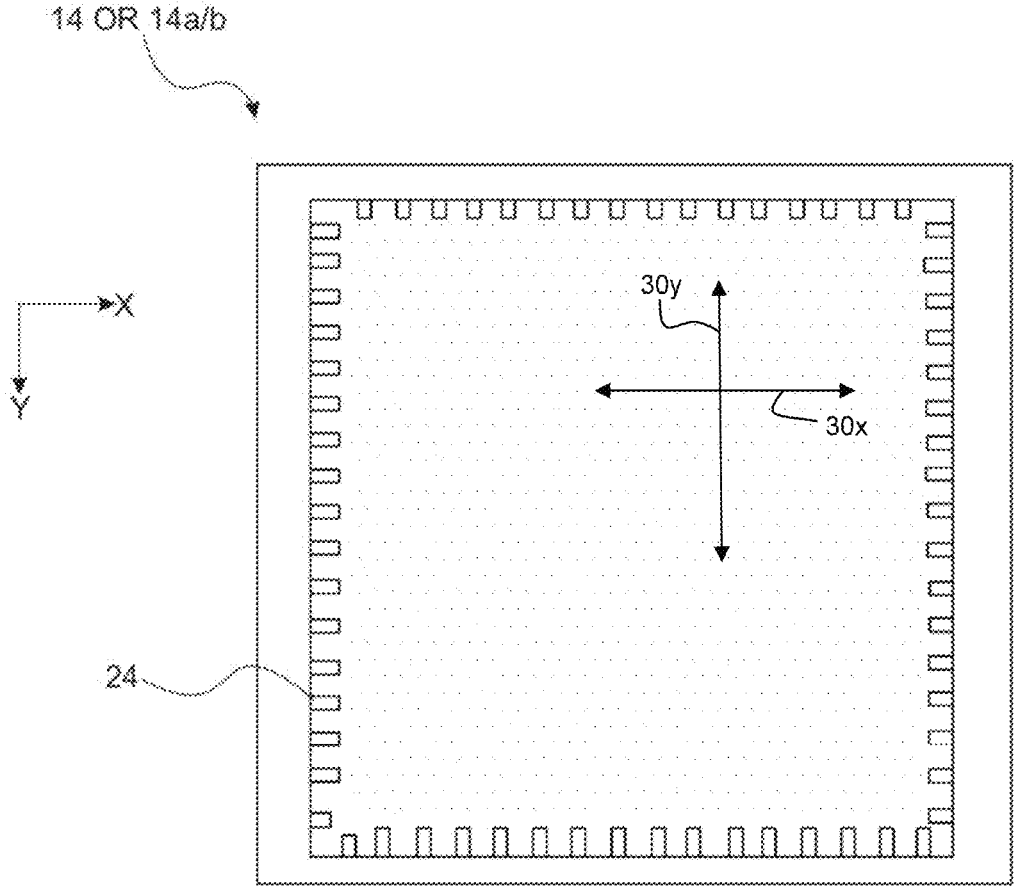

FIG. 4 illustrates a capacitive touch sensor layer of an interactive display according to the present disclosure.

Figure 5:
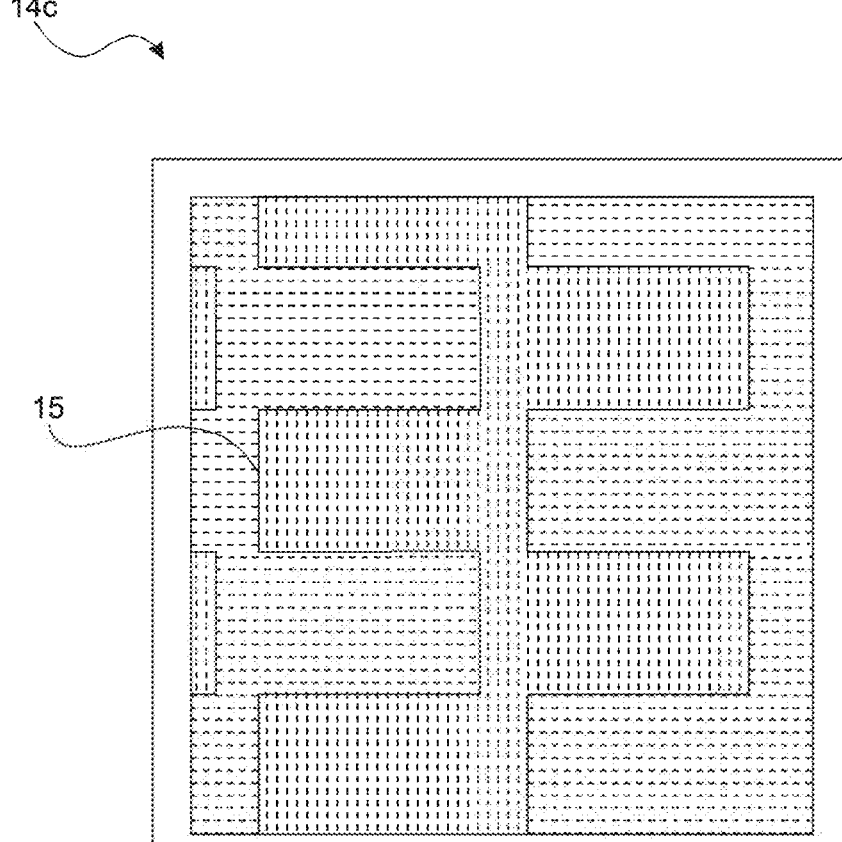

FIG. 5 illustrates a capacitive touch sensor layer formed using conductive paint that includes laser-cut zone separations according to the present disclosure.

Figure 6A:
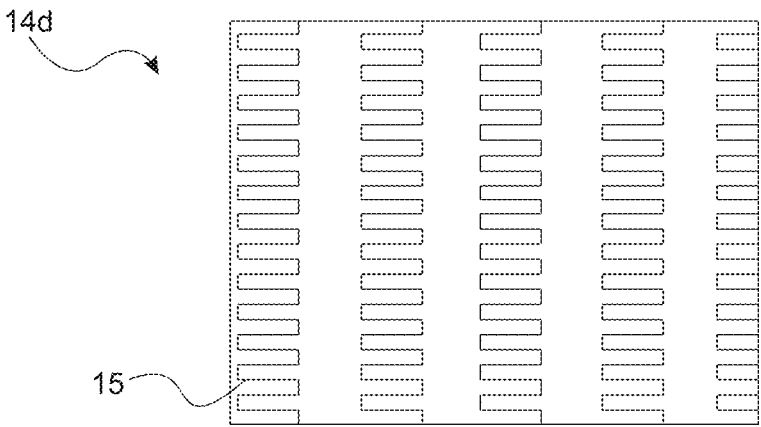
Figure 6B:
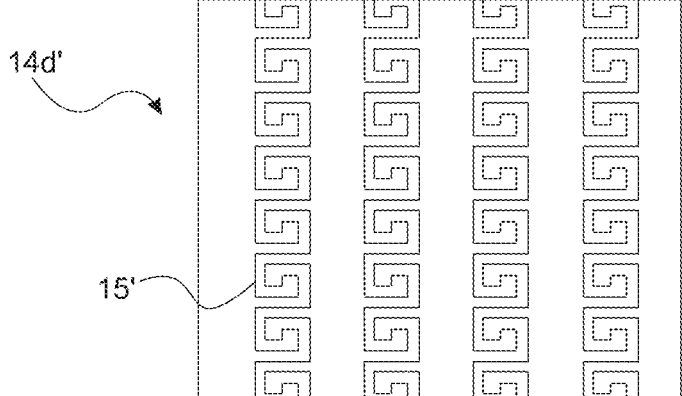

FIGS. 6A and 6B illustrate capacitive touch sensor layers formed using an Indium tin oxide (ITO) coated polyethylene terephthalate (PET) substrate with laser-cut zone separations according to the present disclosure.

Figures 6C, 6D, 6E:
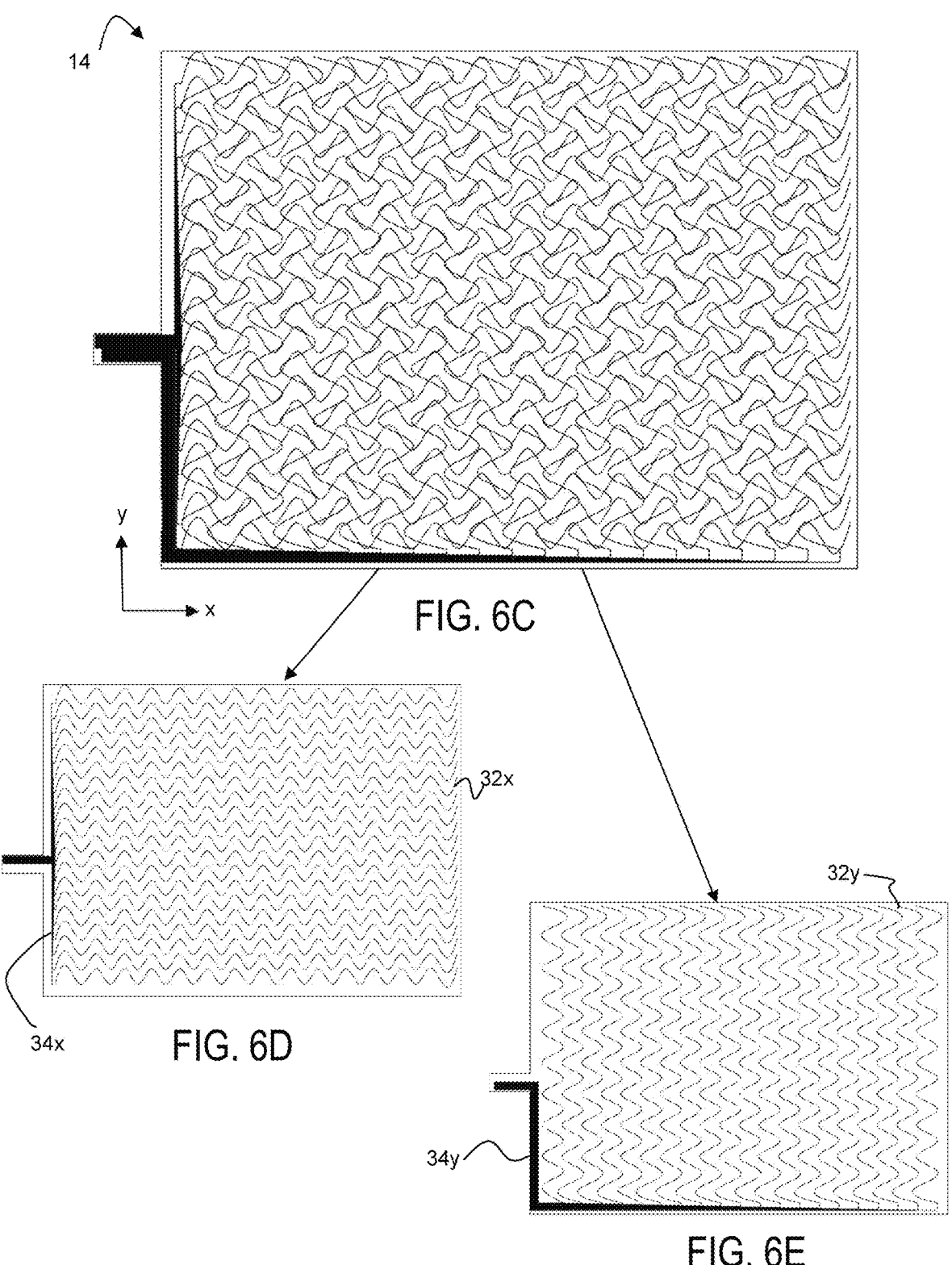

FIGS. 6C-6E illustrate a capacitive touch sensor surface formed using nanowires positioned in an x-y grid pattern, wherein FIG. 6C illustrates the combined x-y grid of nanowires and FIGS. 6D and 6E show the nanowires positioned in the x and y axis, respectively.

Figures 7A, 7B, 7C:
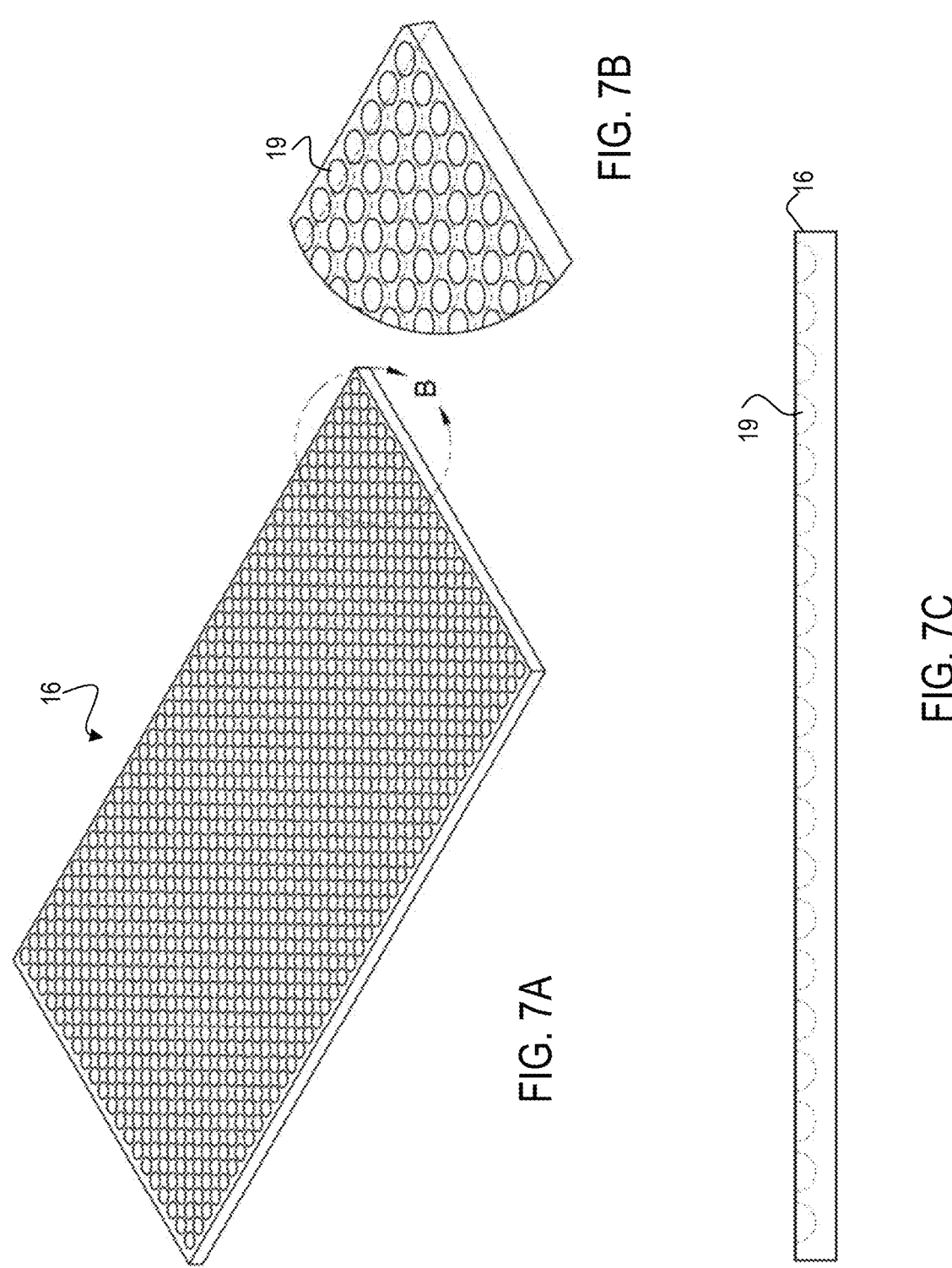

FIGS. 7A-7C illustrate a light layer comprising lenses according to the present disclosure, wherein FIG. 7A provides a perspective view, FIG. 7B provides an enlargement of detail B shown in FIG. 7A, and FIG. 7C provides a side view of the light layer showing the lenses as depressions in the light layer.

Figure 8A:
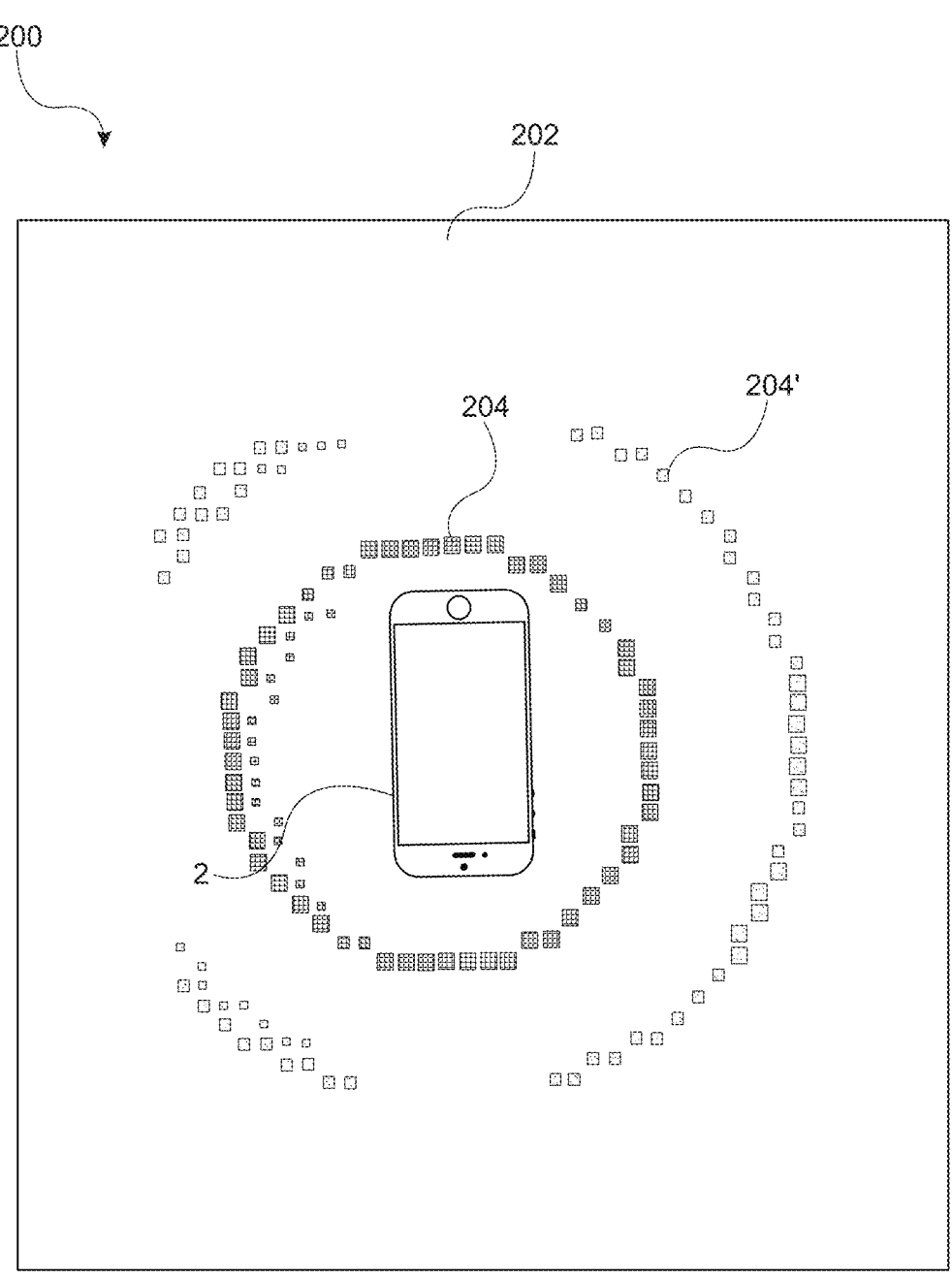

FIG. 8A illustrates an interactive display surface according to the present disclosure, wherein a localized area senses the presence of another device.

Figure 8B:
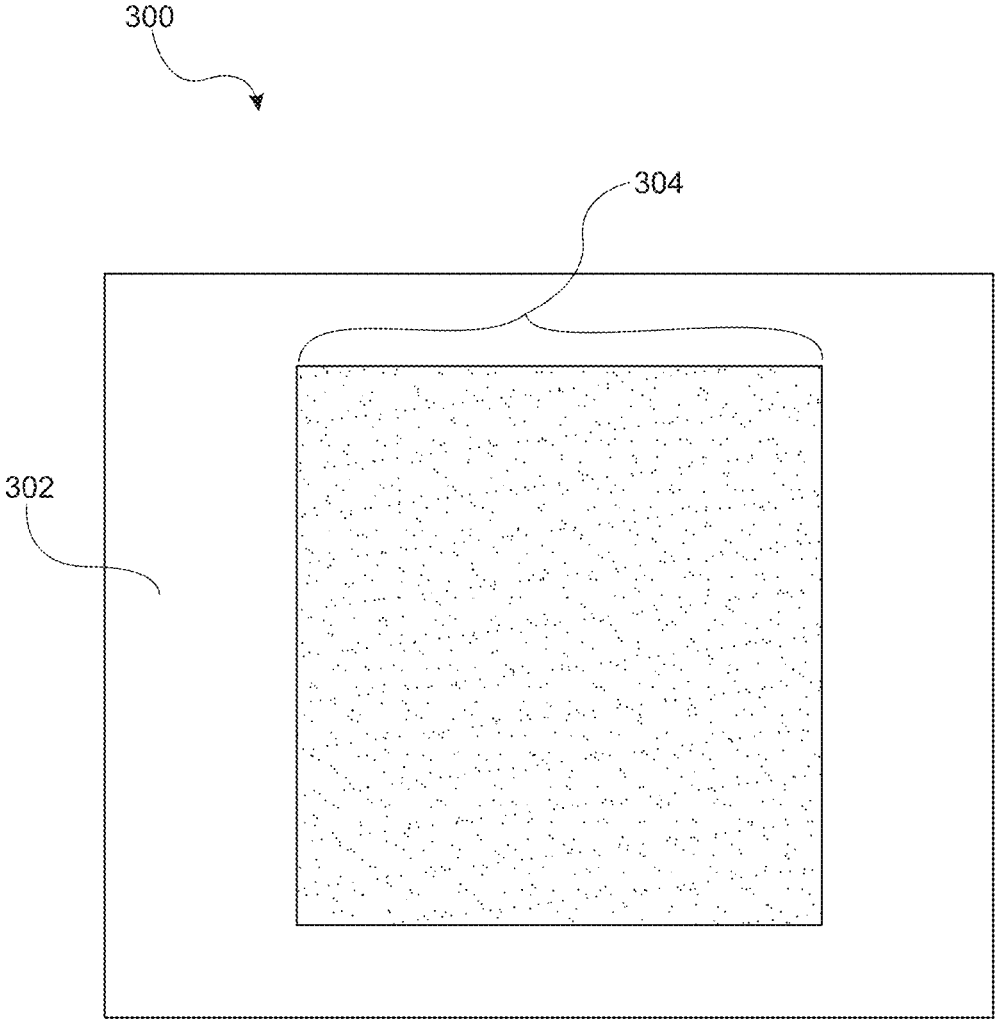
Figure 8C:
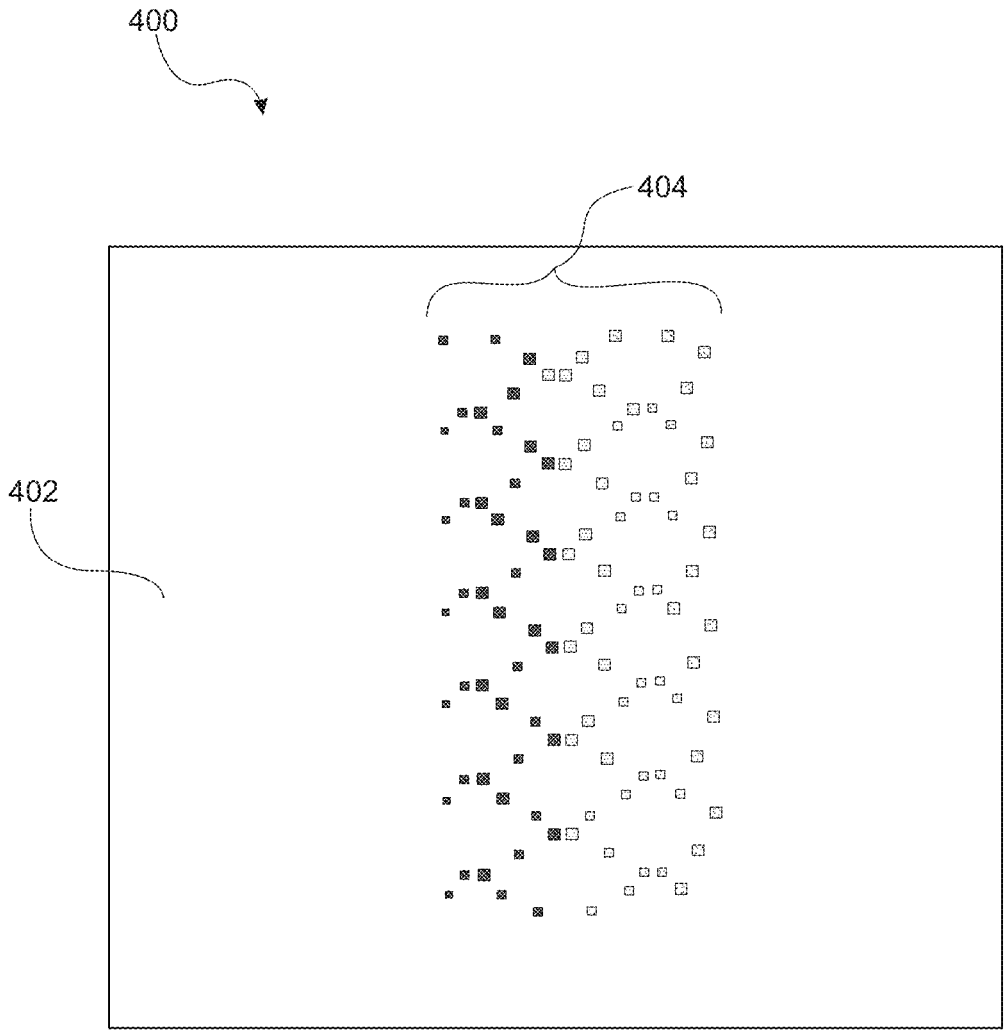

FIGS. 8B and 8C illustrate an interactive display surface according to the present disclosure showing possible variations of room illumination for a wakeup alarm.

Figure 9A:
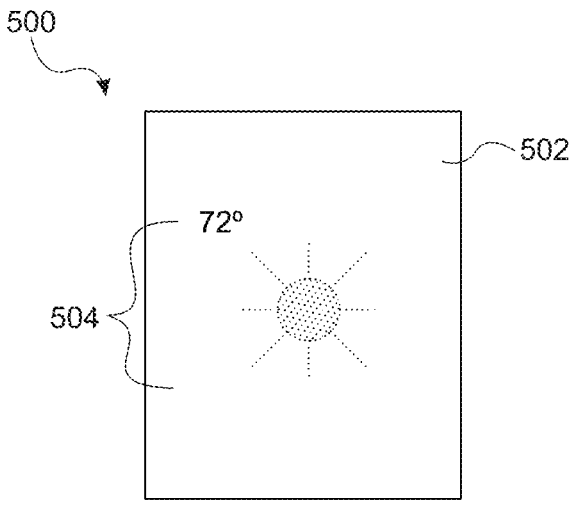
Figure 9B:
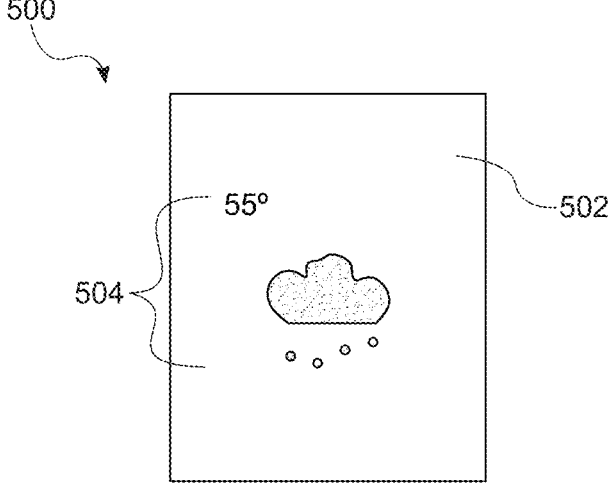

FIGS. 9A and 9B illustrate an interactive display surface according to the present disclosure showing current weather conditions.

FIGS. 10A-10D illustrate an interactive display surface integrated into different types of furniture according to the present disclosure including a coffee table, a bed side table, a desk or counter, and a table, respectively.

Figure 11A:
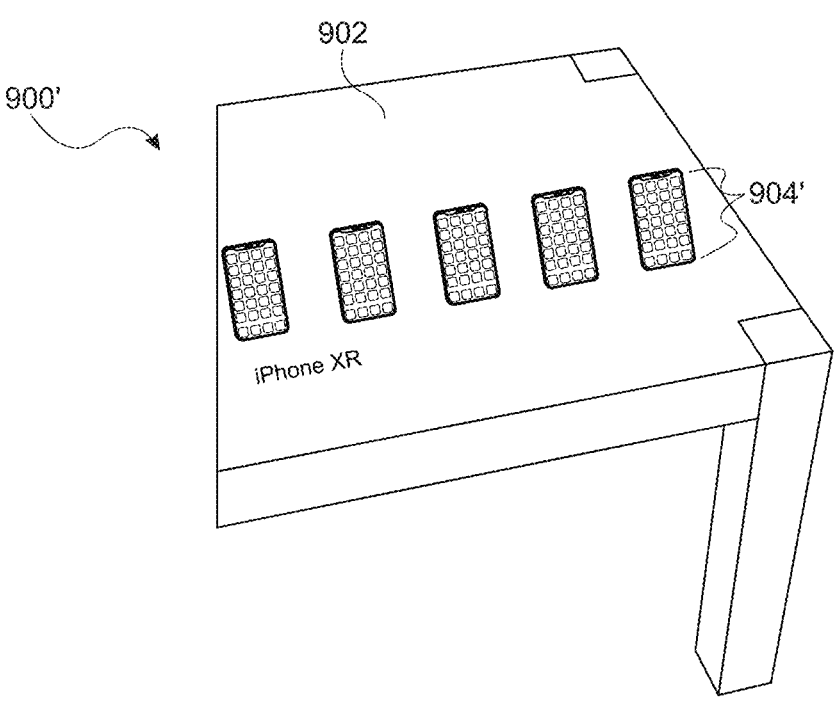
Figure 11B:
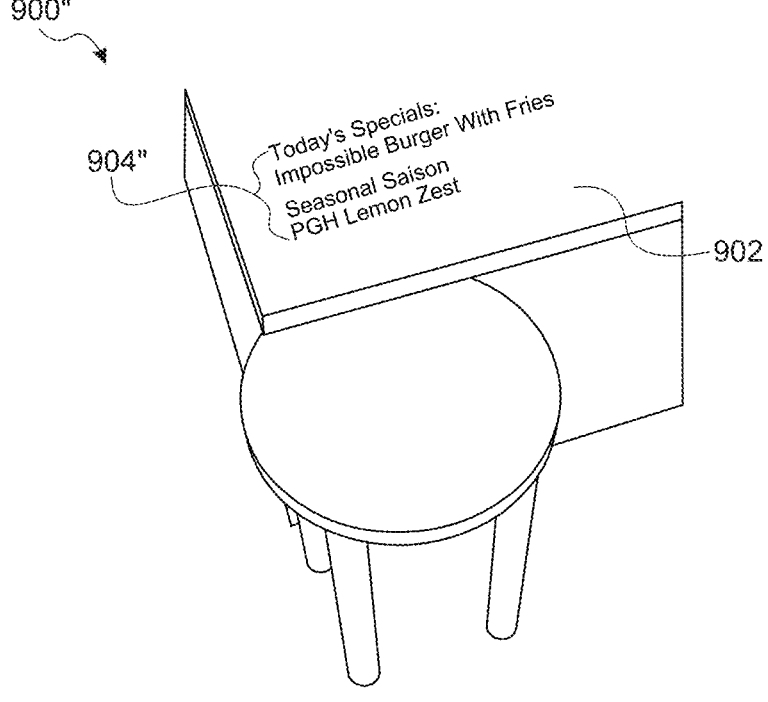

FIGS. 11A and 11B illustrate an interactive display surface integrated into different types of commercial furniture including a retail display and a restaurant/bar tabletop or countertop, respectively.

Figure 12A:
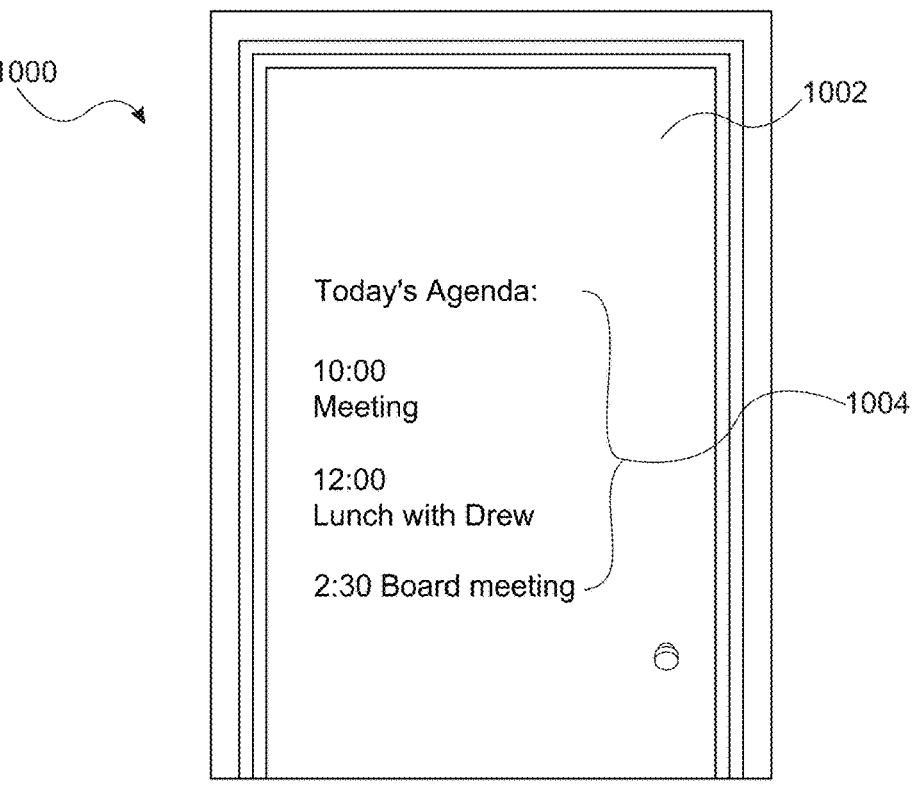
Figure 12B:
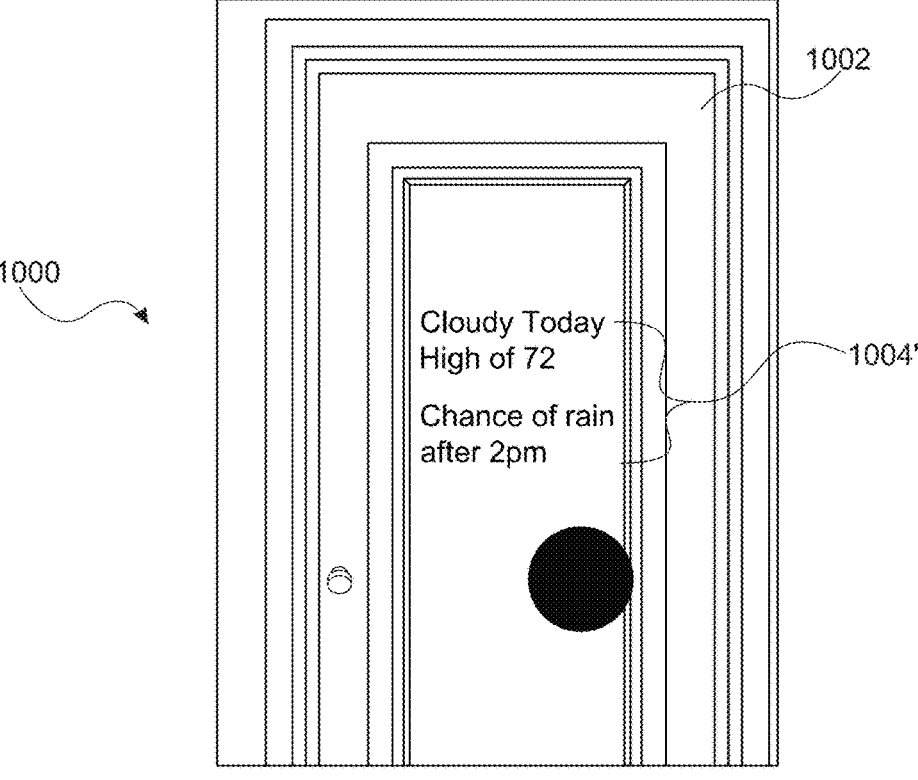

FIGS. 12A and 12B illustrate an interactive display surface integrated into different types of doors including an office or retail door and an interior residential door, respectively.

Figure 13A:
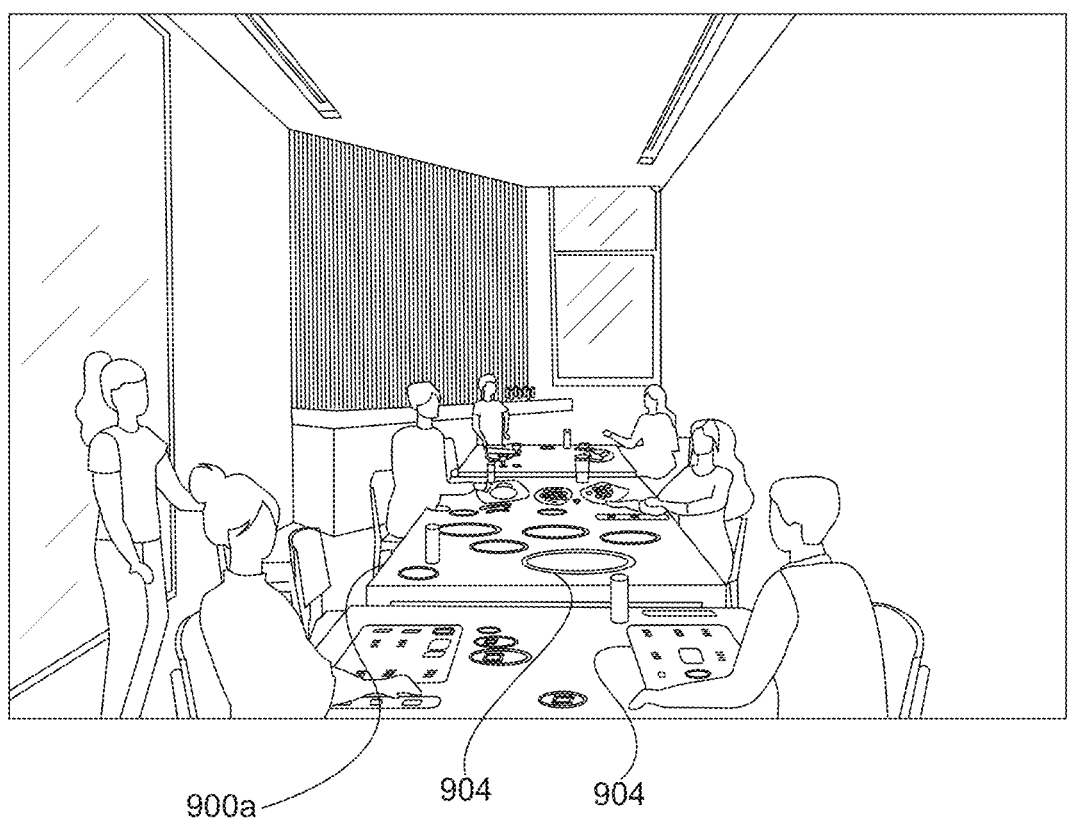
Figure 13B:
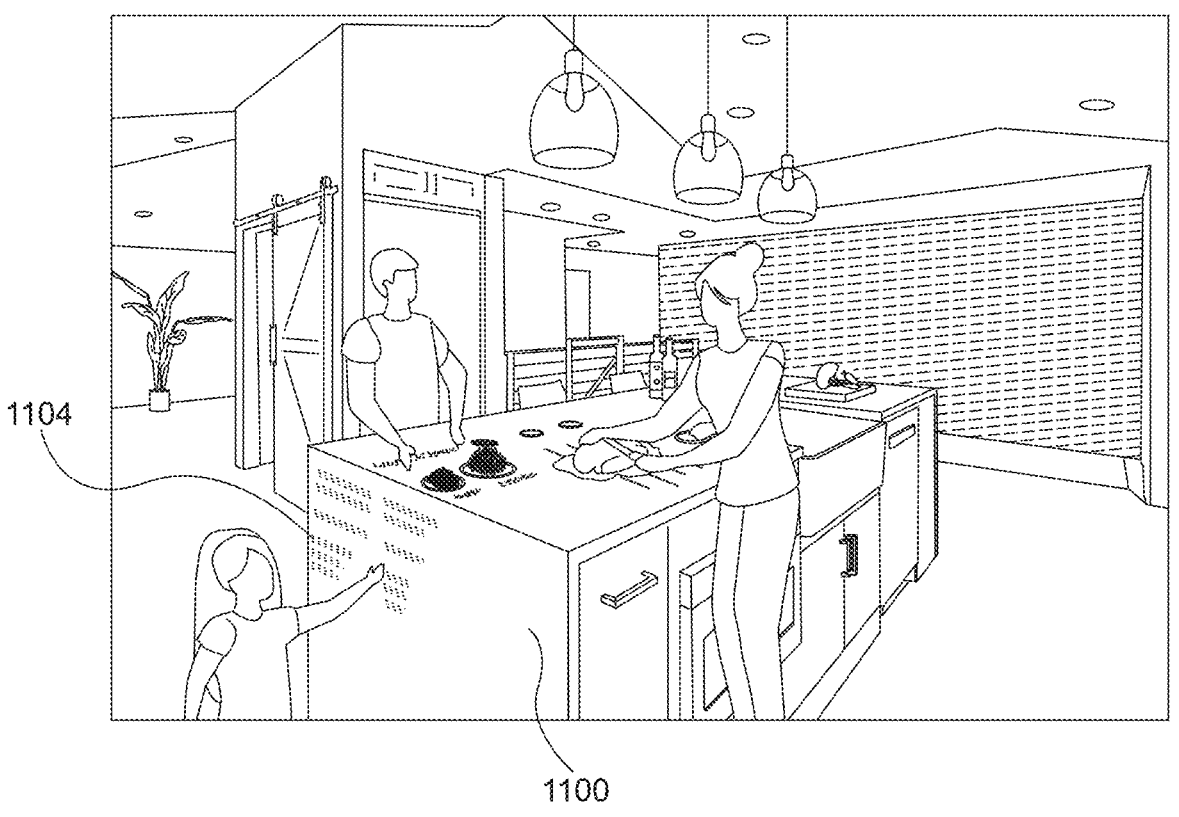

FIGS. 13A and 13B illustrate multiple interactive display surfaces incorporated into tables at a restaurant and a countertop in a residential kitchen, respectively.

Figure 14:
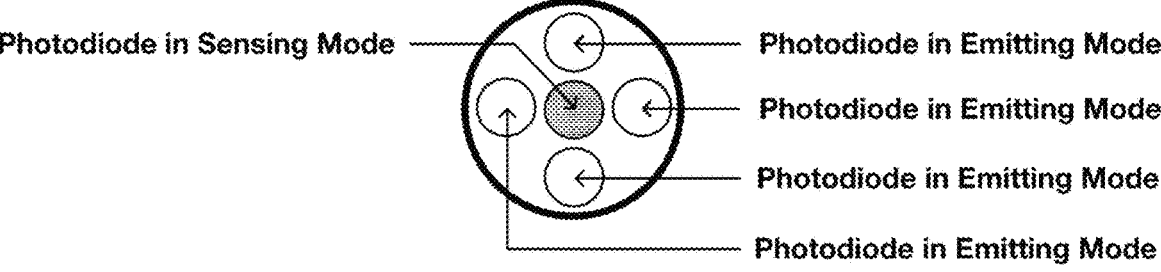

FIG. 14 illustrates the photodiodes on an individual light element of a light layer of an interactive display according to the present disclosure.

Figure 15A:
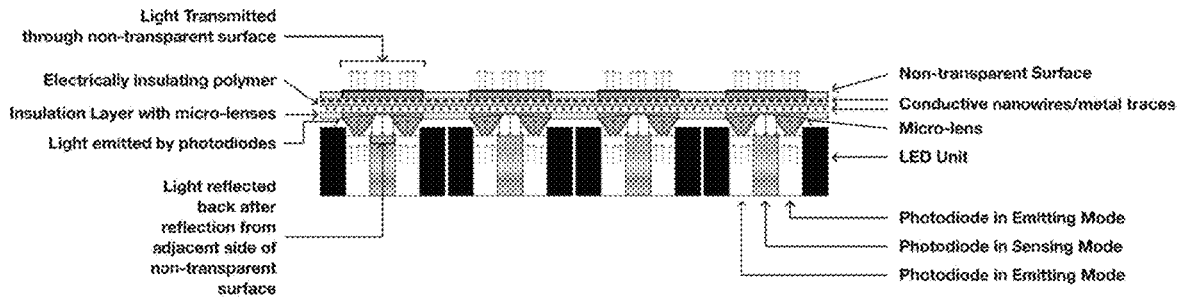
Figure 15B:
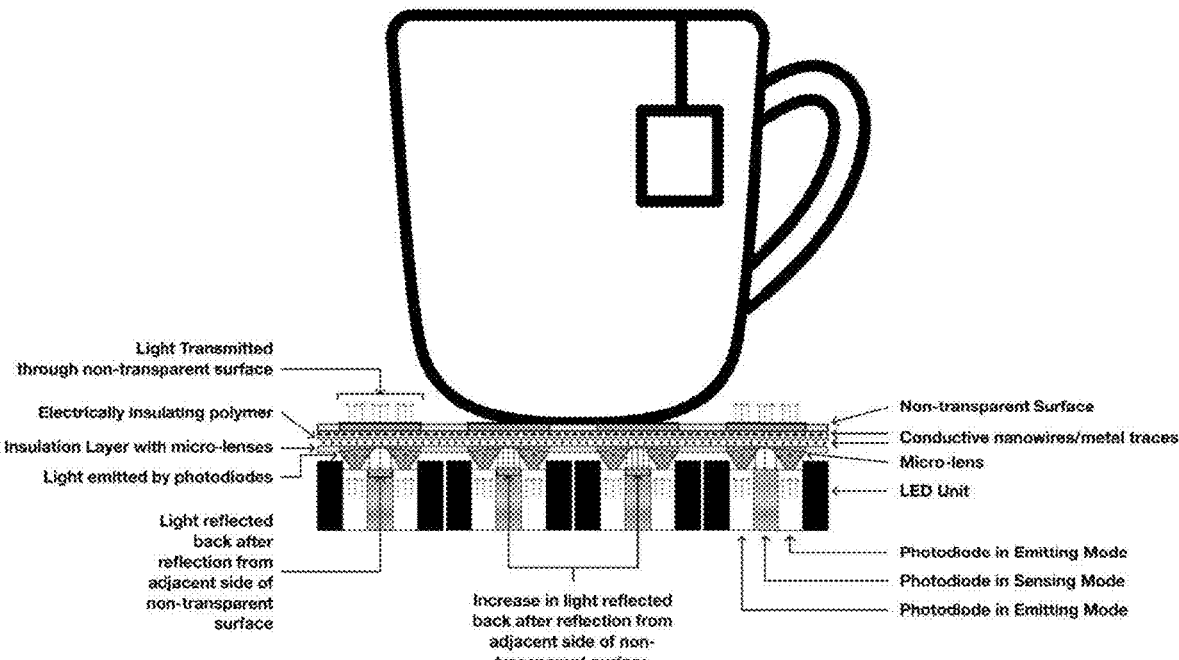
Figure 15C:
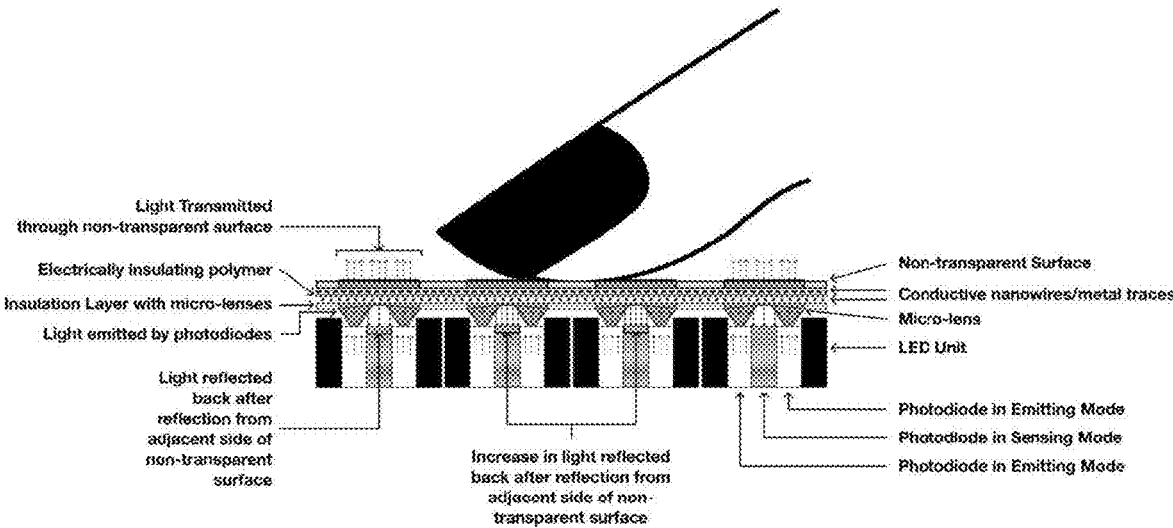
Figure 15D:
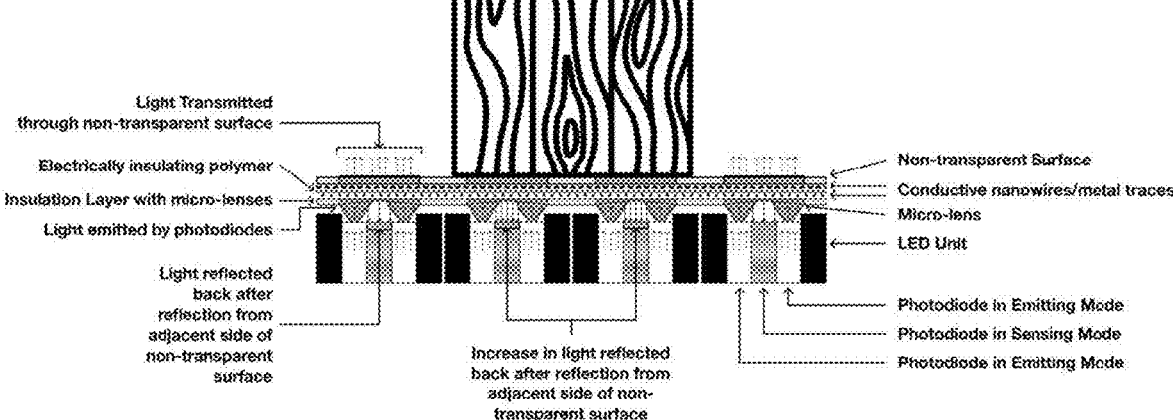

FIGS. 15A-15D illustrates a cross-sectional view of an interactive display according to the present disclosure, wherein FIG. 15A illustrates the device absent objects on the non-transparent surface and FIGS. 15B-15D illustrate the device with various objects contacting the non-transparent surface.

Figure 16A:
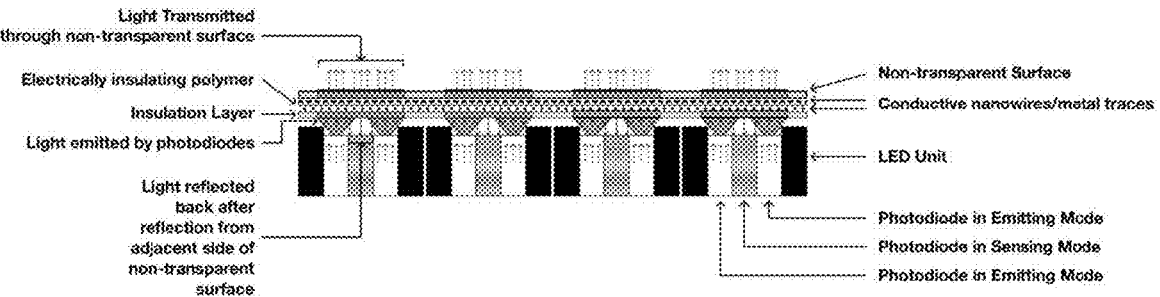
Figure 16B:
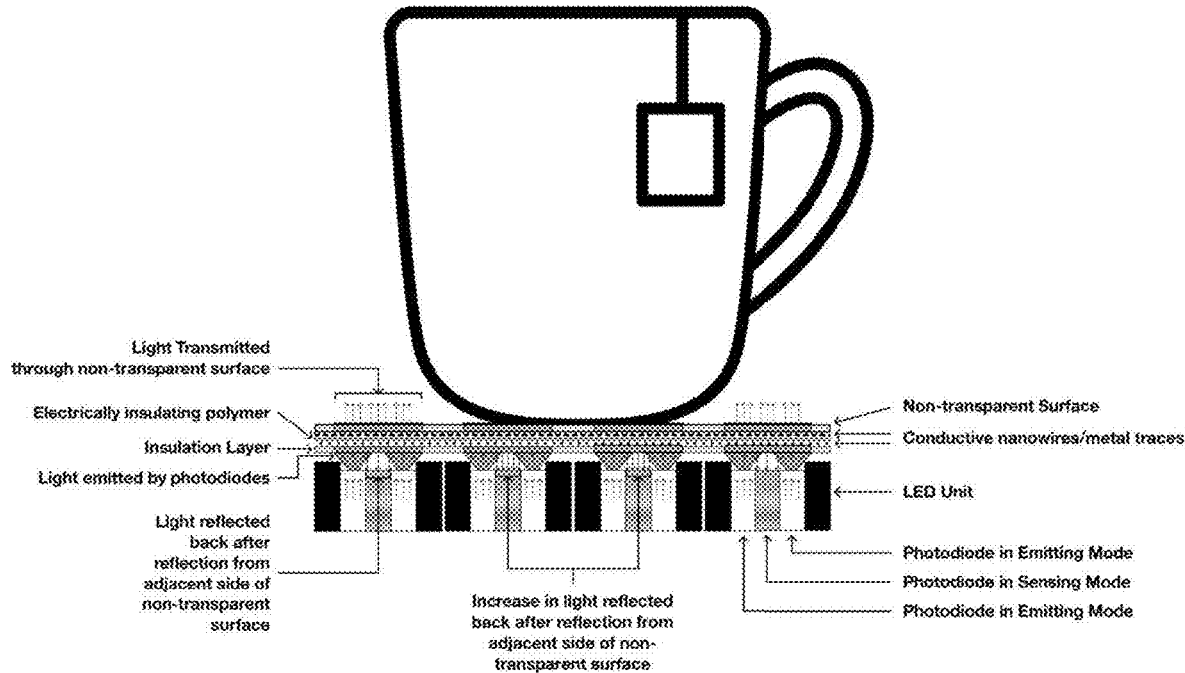
Figure 16C:
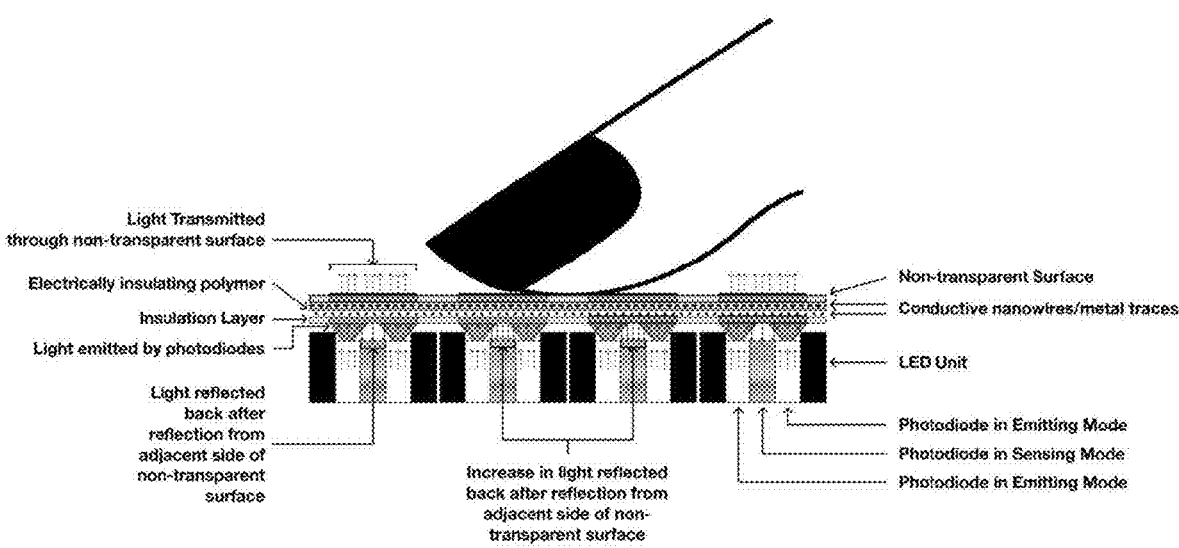
Figure 16D:
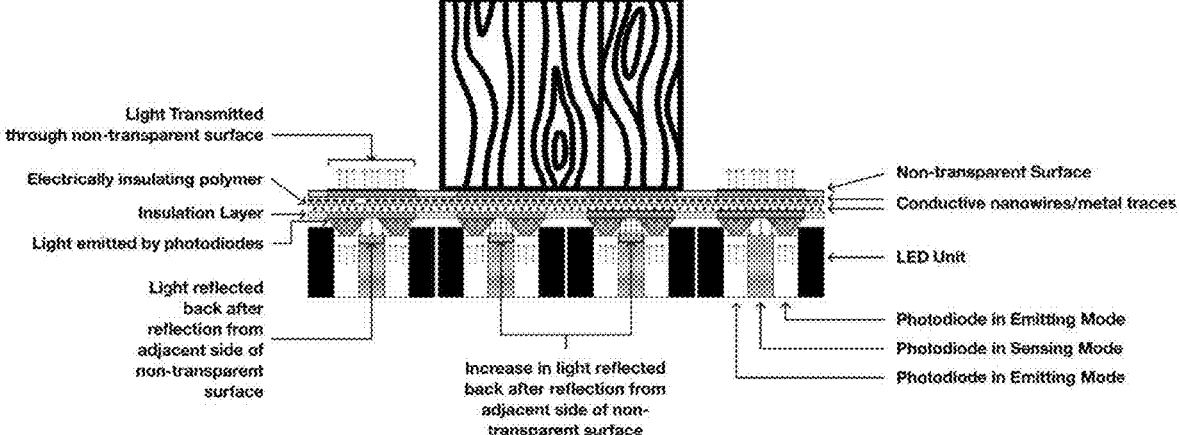

FIGS. 16A-16D illustrates a cross-sectional view of an interactive display according to the present disclosure, wherein FIG. 16A illustrates the device absent objects on the non-transparent surface and FIGS. 16B-16D illustrate the device with various objects contacting the non-transparent surface.

Figure 17C:
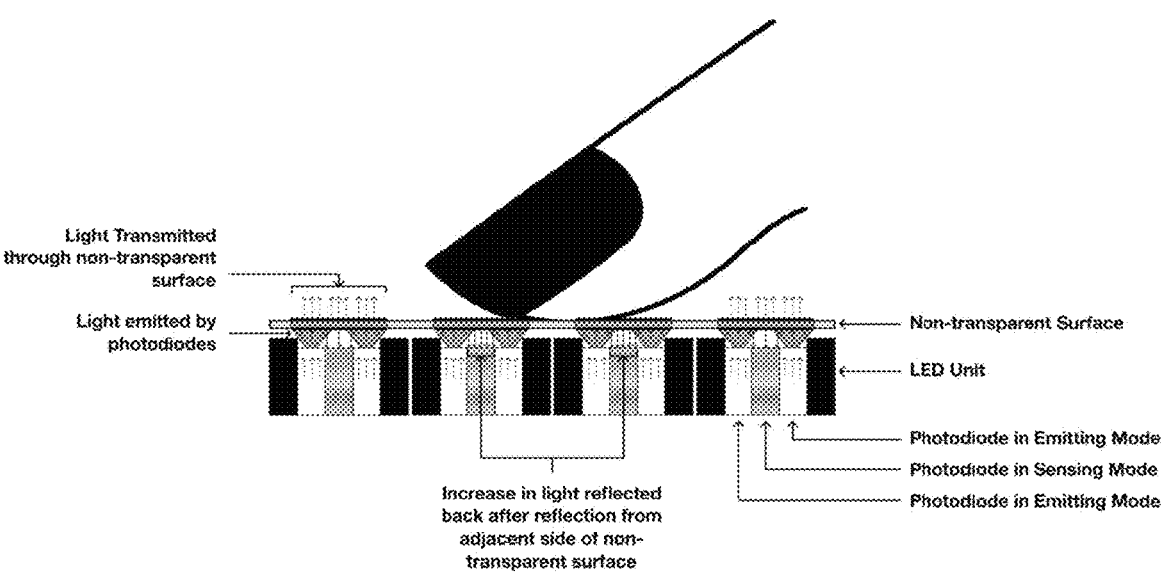
Figure 17D:
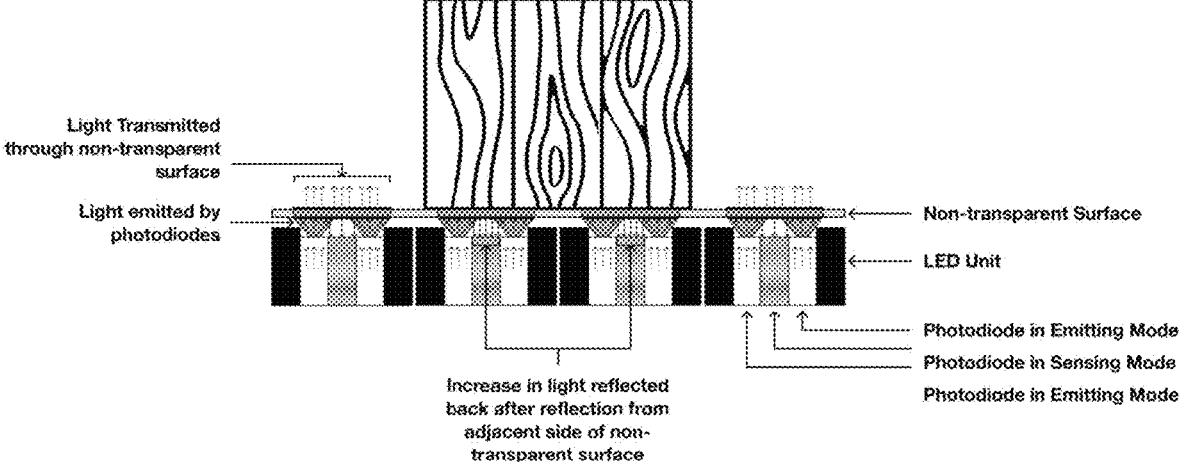

FIGS. 17A-17D illustrates a cross-sectional view of an interactive display according to the present disclosure, wherein FIG. 17A illustrates the device absent objects on the non-transparent surface and FIGS. 17B-17D illustrate the device with various objects contacting the non-transparent surface.

DETAILED DESCRIPTION

The present disclosure relates to devices and assemblies that provide interactive touch and proximity responsive surfaces and visible displays that may be incorporated into a wide range of substrates and objects having non-transparent surfaces, including walls, floors, doors, furniture, dashboards, and other panels.

The novel interactive display surfaces of the present disclosure provide users with access to pertinent information and/or internet connectivity in an unexpected way. While we are surrounded by traditional black, glass screens, the presently disclosed assemblies and surfaces receive inputs and provide information that is visible through a variety of non-transparent materials that blend seamlessly with the environment. When not in use, the touch screen-integrated object (table, counter, door, etc.) serves its normal function and the interactive surface is not visible. When the display is in use, such as by activation via touch or proximity input, the added functionality comes to life. Thus, the interactive display surfaces of the present disclosure provide user interfaces that are invisible, i.e., blend with the room or environment, effectively adding digital user interfaces (UI) to non-technology products and surfaces.

Prior to setting forth the aspects of the devices and methods of the present disclosure in greater detail, it may be helpful to an understanding thereof to set forth the following definitions of certain terms to be used hereinafter.

Definitions and Abbreviations

The word "comprising" and forms of the word "comprising," as used in the specification including the appended claims, does not limit the devices and methods of the present disclosure to exclude any variants or additions. Additionally, although the devices and methods of the present disclosure have been described in terms of "comprising", the devices, assemblies, and methods detailed herein may also be described as consisting essentially of or consisting of. For example, while the devices and methods of the present disclosure have been described in terms of an assembly comprising multiple layers, an assembly consisting essentially of or consisting of the same layers is also within the present scope. In this context, "consisting essentially of" means that any additional layers in the assembly or steps in the methods will not materially affect the output produced by the assembly.

As used in the specification including the appended claims, the singular forms "a," "an," and "the" include the plural, and reference to a particular numerical value includes at least that particular value, unless the context clearly dictates otherwise.

The use of "or" means "and/or" unless specifically stated otherwise.

As used herein, the term "substantially" may be taken to represent the inherent degree of uncertainty that may be attributed to any quantitative comparison, value, measurement, or other representation. Thus, the term substantially may mean an amount of generally at least about 80%, about 90%, about 95%, about 98%, or even about 99%. If referring to a level of non-transparency, for example, the term "substantially" may be referenced to an overall percentage of opacity.

Other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and appended claims are approximations that may vary depending upon at least the substrate used, the type and form of touch sensitive and display surfaces, and the size of the assembly or device comprising the assembly. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard variation found in their respective testing measurements.

"Including" and like terms means including, but not limited to. When ranges are given, any endpoints of those ranges and/or numbers within those ranges can be combined within the scope of the present disclosure.

As used herein, the term "digital information" may be understood to include any textual or graphical information, inclusive of video, that may be conveyed by a processor, such as a central processing unit (CPU) or graphical processing unit (GPU), and displayed by the light layer of the present disclosure.

As used herein, the term "internet of things" or "IoT" is a system of interrelated computing devices, mechanical and digital machines provided with unique identifiers and the ability to transfer data over a network without requiring human-to-human or human-to-computer interaction or the interconnection via the internet of embedded applications in devices that enables those devices to send and receive data from other devices.

As used herein, the term "nanowire" may be understood to mean a wire having a ratio of the length to width of greater than 1000. Typical nanowires of the devices of the present disclosure are 1-250 microns thick, such as about 25 microns thick.

The devices and methods detailed in this disclosure are not limited to the specific devices, methods, processes, elements or parameters described and/or shown herein and the terminology used herein is for the purpose of describing particular embodiments and is by way of example only and not intended to be limiting of the claimed devices and methods. Any and all patents and other publications identified in this specification are incorporated by reference as though fully set forth herein.

In the following description, certain details are set forth in order to provide a better understanding of various embodiments of an interactive display surface. However, one skilled in the art will understand that these embodiments may be practiced without these details and/or in the absence of any details not described herein. In other instances, well-known structures, methods, and/or techniques associated with methods of practicing the various embodiments may not be shown or described in detail to avoid unnecessarily obscuring descriptions of other details of the various embodiments.

Overview of the Interactive Display Surface

Existing touch screen displays, and surfaces have one thing in common—they all look like screens/displays. More specifically, when then are not powered on, they present a surface that is black or grey-looking glass or clear plastic slab. In addition, for touch screens currently on the market, the entireties of their screens are powered on (even the black areas) when they are activated. They do not provide for powering of selected areas or individual pixels of the screen. In comparison, the interactive display assemblies and surfaces of the present disclosure afford operation or activation of specific areas and even specific pixels that are displayed through the surface of substantially non-transparent materials when activated by user touch or proximity, e.g., the user may hover a finger or hand over the region of the display, or use a specific movement detected by the sensor and understood by the electronics associated with the display. This ability allows the assemblies to be incorporated into a substantially non-transparent surface without transforming that surface into a traditional-looking touchscreen.

These display assemblies and surfaces can be embedded in furniture, such as tabletops, counters, doors, walls, and even ceilings. They can be used as a standalone IOT device to control thermostats, sound systems, or other household connectivity. Commercially, they can be used to provide information in transit systems (e.g., airports and airplanes, bus stations and buses, etc.), restaurants and bars, retail environments, offices and office buildings, among others, by configuring the display surfaces to show maps and directions, schedules, menus, specials, advertising, emergency information and alerts, etc.

Some non-limiting examples of types of surfaces that fall within the scope of the devices and methods of the present disclosure include furniture and furnishing such as tables, desks, retail/commercial tables and displays; surfaces such as elevator doors and panels, walls, vehicle dashboards, vehicle interior and exterior surfaces, counter tops, work surfaces, gaming surfaces, electronic device cases, appliance doors and fronts, cabinet doors, residential and commercial interior and exterior doors, hanging panels, decorative surfaces, children's toys, coverings and panels for electrical switches, outlets, receptacles and the like, window treatments, blinds, and shades; public display and signage areas such as notice boards, maps, signage, vending machine display panels; and skins and exterior surfaces for robotic applications, industrial automation equipment and machinery.

There are a wide variety of surface materials that can be incorporated into an interactive display surface according to the present disclosure, including but not limited to natural materials such as wood, fiber, stone, and leather, as well as man-made materials such Corian®, quartz, polymers, ceramics, alloys, vinyl, opaque acrylics, other plastics and composites thereof. When not in use, an interactive display surface provides no indication that it is an electronic device, as the embedded layers are not visible, and only when used or activated does the light layer glow through the wood or other material to display digital information.

For example, an exemplary implementation of the devices and methods of the present disclosure is a coffee table that allows users to interact with its built-in pixel display and touch sensing capabilities for fun, interactive games, and colorful, playful shape and sound interactions. As a bedside table, the display surface serves to enhance sleeping and waking with integrated sleep and wake functions such as clocks, lighting, sound. When integrated in a table, such as found in a restaurant (see 900" of FIG. 12B; 900*a* of FIG. 13A), the display surface may provide menu options, nutrition information, news of the day, interactive games for customers to play while waiting for their food or server, automated ordering from the table, etc. (see 904" of FIG. 12B; 904 of FIG. 13A). When integrated on a kitchen counter (1100), such as shown in FIG. 13B, the display surface may show recipes, shopping lists, to do lists, weekly menus, etc. (see 1104 of FIG. 13B).

Moreover, the interactive display devices may provide interaction with other devices, such as Amazon Alexa, Google Home and Nest, among others, to provide alerts, announcements, etc. on the display. These are just a few examples of how the interactive display devices can be incorporated into surfaces in a user's environment. Additional examples are provided hereinbelow.

Overview of the Layers of the Interactive Display Surface

The interactive display device of the present disclosure is formed by an assembly of multiple layers that include at least a sensor layer and a light layer, and a microcontroller. The assembly may be integrated with a non-transparent surface layer, such as to form a panel or part of an object (e.g., wall, floor, door, furniture, etc.), so that it blends seamlessly with the environment, such as with the surface of a piece of furniture.

With specific reference to the figures, perspective and exploded views of an assembly forming an interactive display of the present disclosure are shown in FIGS. 1A and 1B, respectively. The assembly 10 comprises a frameless outer perimeter 2, a top surface 11, a bottom surface, and a plurality of layers therebetween including at least a sensor layer 14 and a light layer 18, each of which generally extend to the outer perimeter 2 of the assembly 10 so that the entire surface 11 of the assembly is configured to receive input from the sensor layer 14 and provide output on the light layer 18. Between the sensor layer 14 and the light layer 18 may be an insulation or barrier layer 16 that is substantially transparent.

Figure 2A:
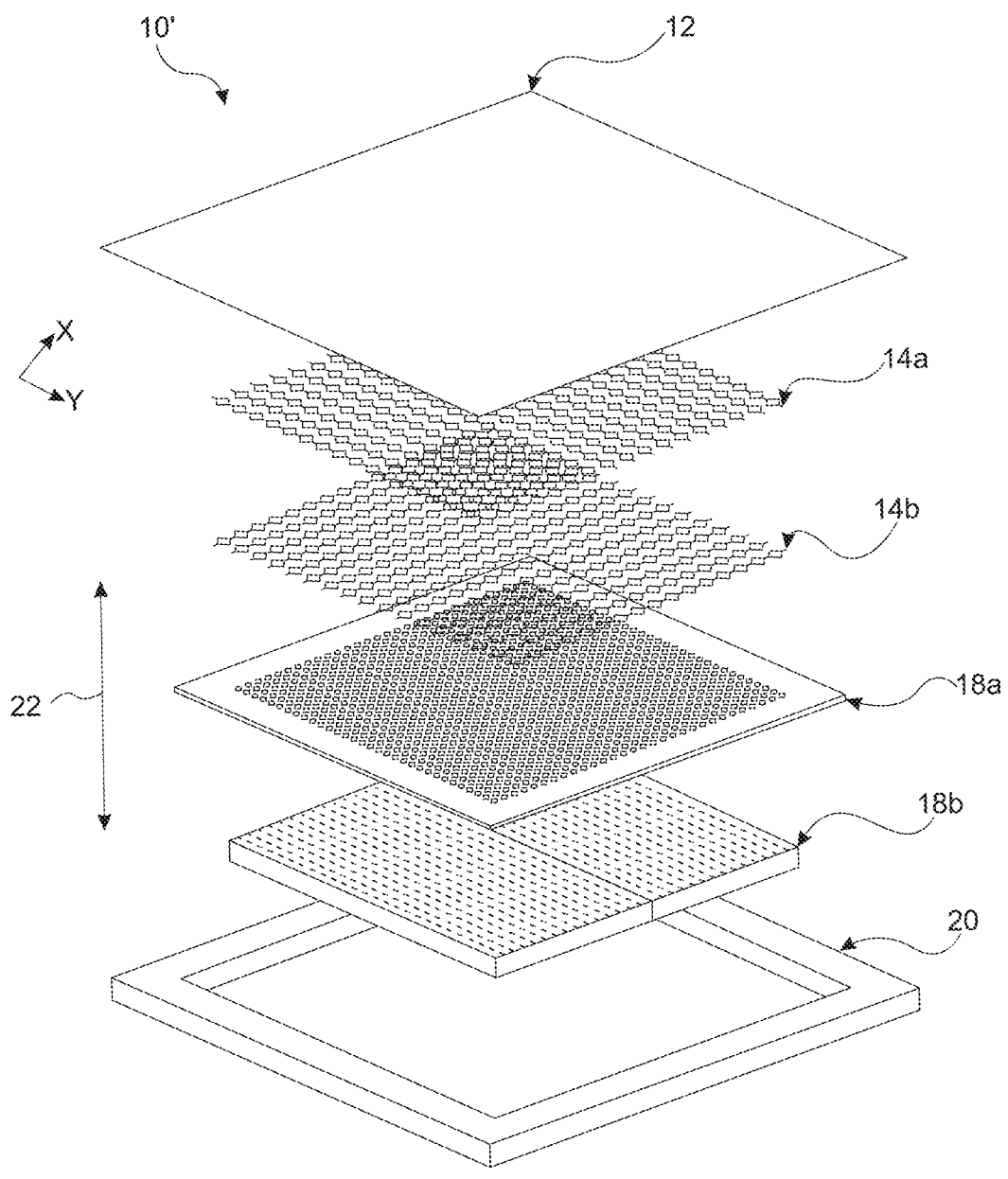

An alternative assembly 10' of the present disclosure is illustrated in FIG. 2A, wherein the sensor layer is shown to include two layers (14*a*, 14*b*) that comprise nanowires or conductive traces directed in either the x direction (14*b*) or the y direction (14*a*). The assembly further includes a low-profile light guide 18*a* positioned above the light layer 18*b*. In this embodiment of the assembly 10', the light layer 18*b* comprises light elements positioned in a grid pattern, wherein the light guide 18*a* includes lenses positioned over each of the light elements that may diffuse and/or focus the light from the individual light elements. Moreover, the lenses of the light guide 18*a* may offer the ability to provide pixel size control for a given LED or OLED bulb size. The lenses will allow smaller LED bulbs to be converted into larger pixels displayed on the surface, and conversely may allow larger LED bulbs to be converted into smaller pixels displayed on the surface.

Figure 2B:
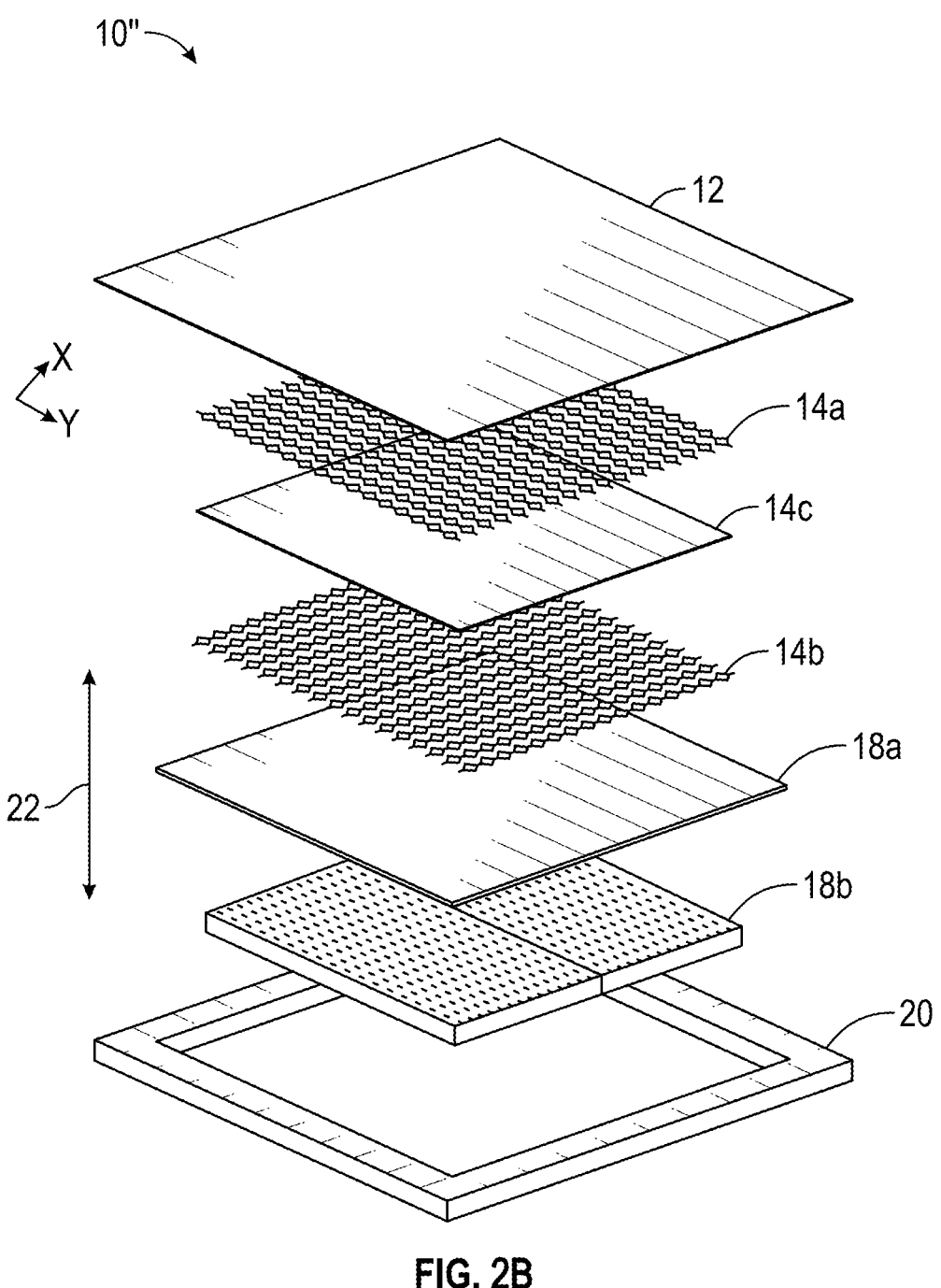
Figure 2C:
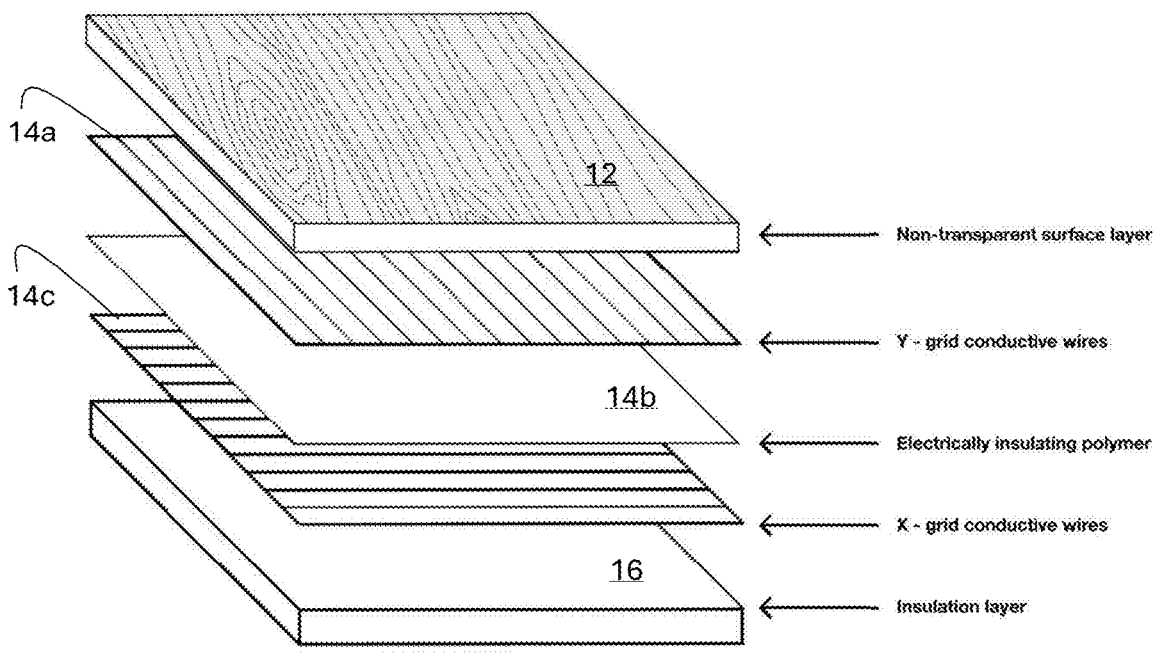

Another alternative assembly 10" of the present disclosure is illustrated in FIG. 2B, wherein the sensor layer is shown to include two layers (14*a*, 14*b*) that comprise nanowires or conductive traces directed in either the x direction (14*b*) or the y direction (14*a*). The two layers may be separated by a thin layer of clear or substantially clear polymeric material 14*c* or by a dielectric coating. For example, a first set of parallel conductive traces or wires 14*b* may be printed onto a substrate, e.g., the insulation layer or light guide, which may then be coated with a dielectric coating, over which a second set of parallel conductive traces or wires 14*a* may be printed on the dielectric coating 90° to the first set. The assembly may further include the light guide 18*a* positioned above the light layer 18*b* (see FIGS. 2A and 2D) or an insulation layer 16 positioned above the light layer 18*b* (see FIG. 2C) or both.

Figure 2D:
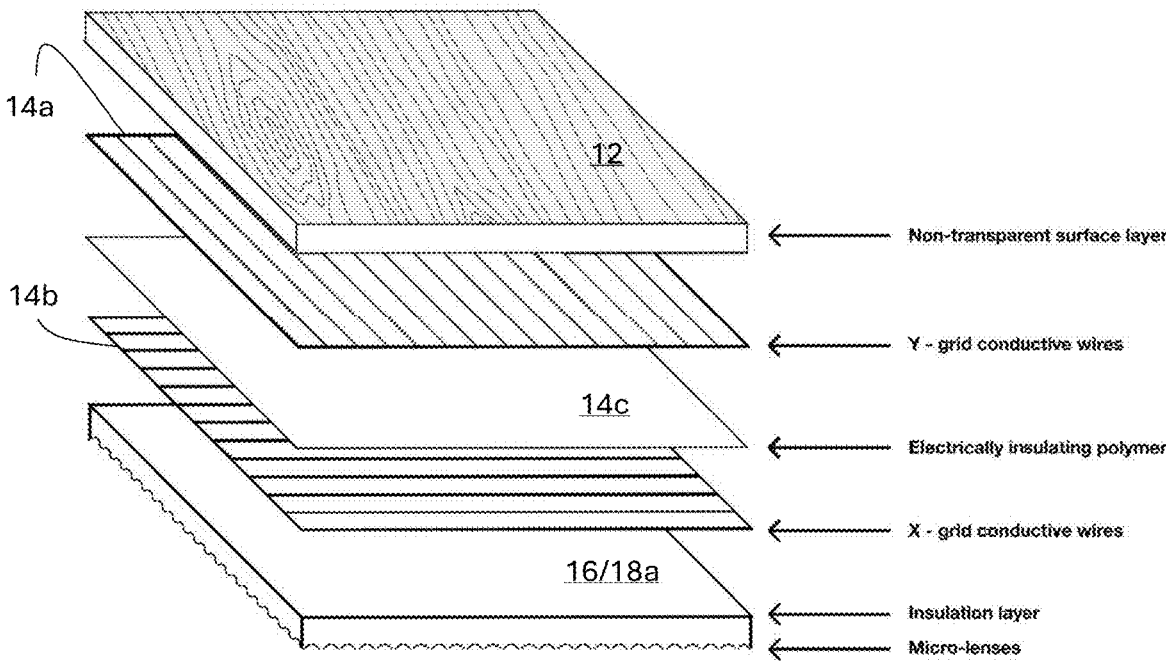

In each embodiment, the light guide 18*a* having lenses that diffuse or focus light from the individual light elements of the light layer 18*b* may act as an insulation layer, in which case the assembly would not need to include the insulation layer 16 (see FIG. 2D). That is, the assembly may include either one of the light layer 18*b* or the insulation layer 16, but not both. Alternatively, should the sensing layer comprise conductive traces printed on a substrate, the lenses of the light guide 18*a* may not be an optimal substrate and the assembly may include an insulation layer 16 comprising the conductive trances printed thereon positioned over the light guide 18*a*. In some configurations, the insulation layer and light guide are the same, i.e., the lenses may be positioned in the insulation layer (see FIG. 2D).

In a further embodiment of the assembly, the conductive material of the sensor layer (14*a'* and 14*b'*) may be configured to have a (i) heating mode that generates heat through Joule heating when a current is applied, wherein the amount of heat generated is controlled by adjusting the current supplied to the nanowires, and (ii) and a touch sensing mode configured to detect touch inputs by forming a capacitive network with a plurality of electrodes, wherein the capacitance is sensitive to proximity or contact of a conductive object. In configurations, this sensor layer may be included as part of an assembly that includes the light guide 18*a* positioned above the light layer 18*b* (see FIG. 2F) or an insulation layer 16 positioned above the light layer 18*b* (see FIG. 2E) or both.

Figure 2G:
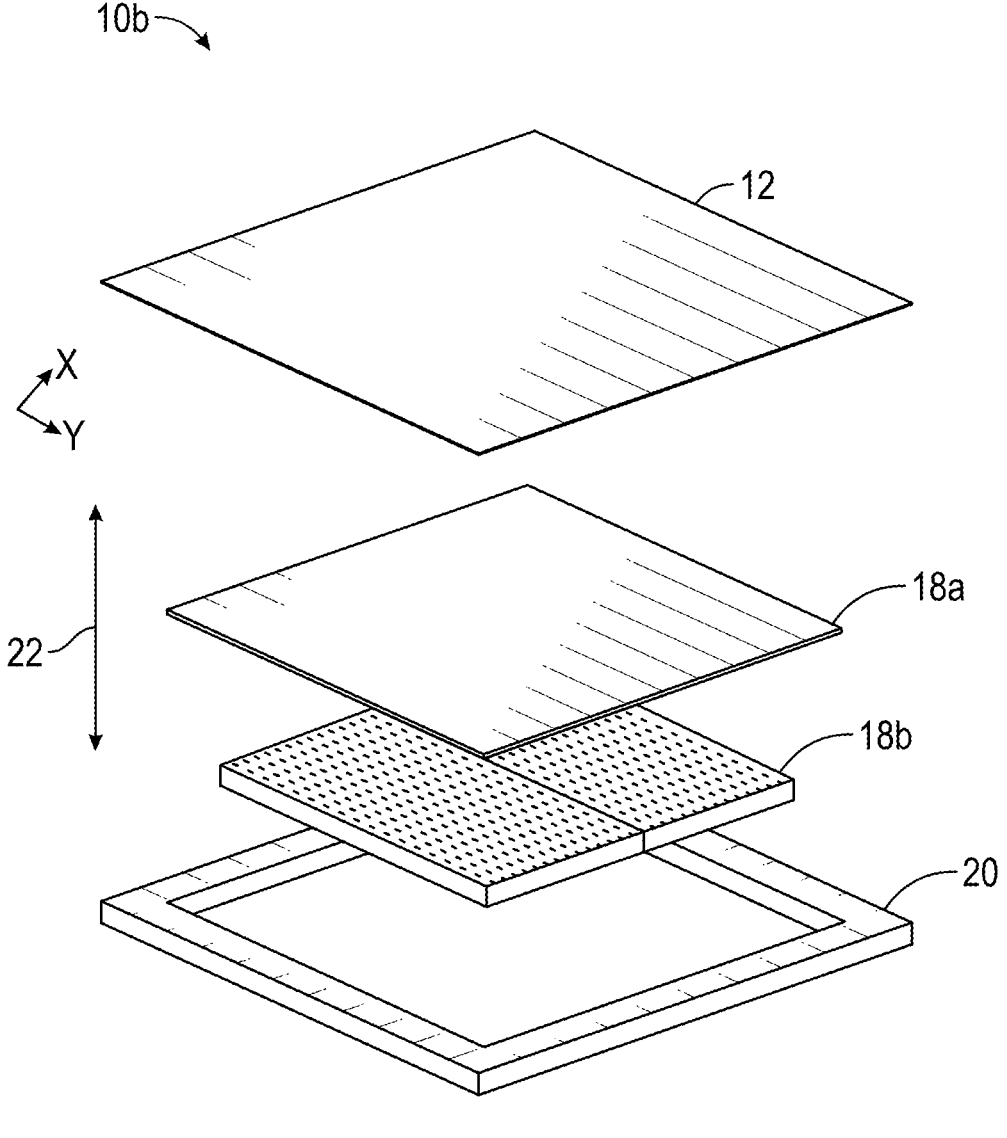

A further alternative assembly 10*b* of the present disclosure is illustrated in FIG. 2G, wherein the light layer 18*b* includes photodiodes configured to operate in photoconductive mode, i.e., also provide sensing ability, while maintaining the ability to display light and thus digital information. As such, the sensing and light capabilities are combined into one layer, i.e., layer 18*b"*. A light guide 18*a* may be included over the light layer 18*b"* or may be omitted. Further, as this assembly would no longer need the sensing layer (14 or 14*a*, 14*b*), the assembly may also be absent an insulation layer 16.

The various layers of the assembly may contact each other with no intervening gaps. For example, the light guide 18*a* may contact the light layer 18*b* with no intervening gaps or layers, other than bonding agents or adhesives. Moreover, the light guide 18*a* may contact the sensor layer (either of 14 or 14*b*) with no gaps or layers, other than bonding agents or adhesives. The light guide 18*a* may contact an insulation layer (e.g., 16) positioned beneath the sensor layer (either of 14 or 14*b*) with no gaps or layers, other than bonding agents or adhesives. The insulation layer 16 may contact the sensor layer (either of 14 or 14*b*) with no gaps or layers, other than bonding agents or adhesives.

Beneath the light layer (18, 18*b*) of either assembly is a support layer 20 that provides rigidity to the device and a bottom surface, i.e., outward facing side of the support layer 20. Moreover, each of the assemblies include a microcontroller comprising at least a processor, a memory, and a wireless transceiver circuit providing wireless communication with an external server or the internet.

The assemblies illustrated in FIGS. 1B through 2G, which include at least the support layer 20 and light layer 18 (FIG. 2G), or at least the support layer 20, light layer 18, and sensor layer 14 (e.g., FIG. 2A, 2B), may be integrated with a non-transparent surface layer 12 in any of the structures or surfaces discussed herein (i.e., wall, furniture, panel, etc.). The sensor layer 14 may be bonded to an underside of a non-transparent surface layer 12, wherein the top side forms the top surface 11 of the final assembly or structure, which now includes an interactive display with a non-transparent surface. Alternatively, the light layer (18 or 18*a* when a light guide is included) may be bonded to the underside of the transparent surface layer 12, wherein the top side forms the top surface 11 of the final assembly or structure. Bonding may be via a substantially transparent adhesive or bonding agent.

The assembly may be provided absent the non-transparent surface layer 12, and the user may integrate the assembly with their non-transparent surface layer. Alternatively, the assembly may be provided with the non-transparent surface layer 12 included. Further yet, the final end product, e.g., door, table, wall, countertop, etc., may be provided with an interactive display device already integrated as at least a portion of a surface thereof.

Each of the various layers of the assembly 10 will be described in greater detail hereinbelow with reference to FIGS. 1B, through 3.

(a) The Non-Transparent Surface Layer

The non-transparent surface layer 12 serves as a user's point of contact with the interactive display surface and provides the seamless integration of the assembly within any of the environments described herein (i.e., office, kitchen, restaurant, etc.). The surface layer 12 also serves as an integral part of the assembly when the interactive display is embedded in a structure, such as a wall, panel, furniture surface, etc., providing a non-transparent surface under which the assembly is hidden when inactive. When a user interacts with the top surface 11, such that the sensor layer 14 registers a contact or proximity of an object, such as aa hand or finger of a user, the light layer 18 may be activated to display digital information.

While clear glass and plastics allow for near perfect transmission of led light through their surfaces, opaque and translucent materials diffuse this light producing a different effect for the transmission of information and data. Therefore, given that different materials diffuse light differently, selection of the surface material and thickness thereof may take into consideration proper diffusion. As an example, when utilizing the diffusion properties of natural wood, the grain pattern and thickness may be selected to allow for the proper display of information. According to aspects of the present disclosure, the non-transparent surface layer is generally 0.2 mm to 5 mm thick, such as less than 1 mm thick for wood veneers or up to 3 mm thick for plastic veneers.

The non-transparent surface layer may be at least 0.2 mm thick, such as at least 0.3 mm, or at least 0.4 mm, or at least 0.5 mm, or at least 0.6 mm, or at least 0.7 mm, or at least 0.8 mm, or at least 0.9 mm, or at least 1.0 mm, or at least 1.1 mm, or at least 1.2 mm, or at least 1.3 mm, or at least 1.4 mm, or at least 1.5 mm, or at least 1.6 mm, or at least 1.7 mm, or at least 1.8 mm, or at least 1.9 mm, or at least 2.0 mm. The non-transparent surface layer may be not greater than 5 mm thick, such as not greater than 4.9 mm, or not greater than 4.8 mm, not greater than 4.7 mm, not greater than 4.6 mm, not greater than 4.5 mm, not greater than 4.4 mm, not greater than 4.3 mm, not greater than 4.2 mm, not greater than 4.1 mm, not greater than 4.0 mm, not greater than 3.9 mm, not greater than 3.8 mm, not greater than 3.7 mm, not greater than 3.6 mm, not greater than 3.5 mm. Any combination of a minimal thickness and a maximum thickness disclosed herein may be combined to define a range of thickness measurements for the surface layer 12.

The surface layer may comprise natural materials, such as hardwood or softwood veneers, stone veneers, and ceramic veneers. Exemplary wood veneers include at least veneers of maple, oak, ash, birch, beech, poplar, walnut, mahogany, pine, teak, basswood, bamboo, balsam, aspen, cedar, spruce, elm, hickory, ebony, rosewood, keruing, ziricote, and wenge. Exemplary stone veneers include at least veneers of marble, limestone, granite, slate, sandstone, laetrete, nice stone, quartzite, travertine, and basalt. Exemplary ceramic veneers include at least veneers of feldspathic ceramic, leucite-reinforced glass ceramics, lithium disilicate reinforced glass ceramics, porcelain, earthenware, and stoneware.

The surface layer may comprise natural fabrics such as silk, cotton, chifon, linen, canvas, satin, viscose, rayon, damask, denim, twill, felt, cheesecloth, corduroy, muslin, lace, and tweed. The surface layer may comprise natural fibers such as wool, cashmere wool, jute, and bamboo and other grasses.

The surface layer may comprise animal skins, such as leather and suede.

The surface layer may comprise synthetic fibers such as aramids, polyester, spandex, nylon, and polypropylene.

The surface layer may comprise non-transparent polymeric surfaces, such as colored acrylic, nylon, polycarbonate, high density polyethylene, low density polyurethane, cellulose resin, epoxy or epoxy resins, PMMA, phenolic resins, and the like.

The surface layer may comprise papers such as acid-free paper, blotting paper, copy and copier paper, manilla paper, newsprint paper, parchment paper, photographic paper, waxed paper, or vellum.

The surface layer may comprise composite veneers such as so-called "solid surface" materials, e.g., "Corian®" and similar materials, carbon fiber, fiberglass, cement, or concrete.

The surface layer may include a paint or coating, such as an acrylic or latex based paint, a lacquer-based coating, and alkyd-based paints, a metallic paint, a siloxane or "dry erase paint," and the like. For example, the surface layer may comprise a polymeric or glass substrate having a non-transparent paint or coating applied thereon to form the non-transparent substrate, Moreover, the surface layer may comprise a standard wall covering, such as wallpaper or wall board, paperboard, and the like.

The surface layer may comprise a metal foil, such as nickel, carbon steel, Inconel, brass, copper, aluminum, titanium, or metalized polyester.

(b) The Sensor Layer

Positioned below the non-transparent surface layer 12 is the sensor layer 14, which is configured to provide interactive feedback to the system through sensing, e.g., touch sensor layer. There are several types of technologies for implementing a touch sensor including for example at least resistive and capacitive.

Capacitive touch sensing devices have been found to work particularly well, such as either of surface capacitance or projected capacitance (self-capacitance or mutual capacitance). Generally speaking, whenever two electrically conductive members come close to one another, their electric fields interact to form capacitance. In the case of a capacitive touch device, when an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the location, pressure, direction, speed, and acceleration of the object as it is moved across the touch surface.

Capacitive touch sensing surfaces may be formed using a wide range of conductive materials generally applied to or supported on a substrate (e.g., polyethylene terephthalate (PET) plastic), such as grids of nanowires and/or traces printed by conductive inks (FIGS. 2A, 2B, 4, and 6C-6E), and surfaces covered by velostat, or coated with a conductive paint (FIG. 5) and/or indium tin oxide ("ITO") (FIGS. 6A and 6B). It will be obvious to one skilled in the art that a wide variety of substrates and materials analogous to PET, nanowires, conductive inks, velostat, conductive paint, and ITO can be substituted for those described herein to achieve a similar result and all such substitutes are hereby incorporated.

Specific arrangements of the sensor layer are shown in the figures, wherein FIGS. 2A, 2B, and 4 each illustrate a sensor layer comprising an arrangement of an X and Y grid (14b and 14a, respectively in FIGS. 2A, 2B; and 30x, 30y, respectively in FIG. 4) of connection points 24 (e.g., bus) wherein capacitive sensing of a position on the sensor layer (i.e., as sensed by the grid of connection points 24) may be received by a sensor driver or controller, such as the sensor driver or printed circuit board shown in FIG. 3. For example, the sensor layer shown in FIG. 4 may comprise a substrate coated with a conductive paint, ink, or ITO, or covered with a conductive material such as velostat. Specific examples are shown in FIG. 5, and FIGS. 6A and 6B, that include a PET substrate having a conductive paint or various arrangements of an ITO coating. Electrodes positioned at perimeters of the coated surface may sense contact, as with the grid of connection points shown in FIG. 4. To improve positional recognition of a touch contact on a sensor layer, such as those that include a full surface coated with velostat or conductive paint (14c) or ITO (14d, 14d'), electric field tomography and a single step gauss newton method may be used to produce tomographic reconstruction, which may simplify the sensor layout (e.g., require fewer connection points 24).

Also shown in FIG. 5, FIGS. 6A and 6B are etched patterns (15, 15') that may isolate regions of the conductive surface so that varied responses may result, i.e., activation of different regions of the light layer and/or activation of the light layer to provide different digital information.

Shown in FIG. 6C is an arrangement of electrodes positioned along x and y axis on a substrate to form the sensor layer 14. FIGS. 6D and 6E show the electrodes on each axis separately for clarity, wherein electrodes 32x on the x-axis are shown in FIG. 6D, and electrodes on the y-axis 32y are shown in FIG. 6E. Exemplary electrodes include at least nanowire, such as a fine gauge wire (<0.001" in thickness). Also shown in FIGS. 6D and 6E are the traces to a common access "tongue" (34x, 34y) which connects to the sensor driver.

Other means to provide interactive feedback with a surface that are possible, and within the scope of the present disclosure, include at least force sensing resistors (FSR), infrared sensors, thermal sensors, lidar sensors, sound or vibration sensors, and time of flight (TOF) laser arrays. Use of an FSR also offers the ability to measure force/depth of touch, thereby distinguishing a light touch from a heavy push. As such, in embodiments where the sensor layer is an FSR, or includes an additional sensor layer comprising an FSR, the interactive display surface may also be configured to measure a weight of an object, such as such as fruits, vegetables and other cooking ingredients.

As discussed, according to certain aspects the sensor layer comprises a grid of conductive wires or traces to provide a capacitive touch sensor. Such a sensor has the ability to perform the dual function of touch sensing and heating. For example, the conductive traces or wires, such as nanowires, may be made of materials with multifunctional capabilities of electrical conductance (capacitive sensing) and Joule heating (resistive heating). Exemplary materials include at least conductive silver metal traces or nanowires, indium tin oxide traces, graphene and other metal inks comprising graphene (e.g., silver inks comprising graphene), certain metal alloys, and zinc oxide Zinc oxide (ZnO) can be hybridized with a porous polydimethylsiloxane (PDMS) dielectric layer to create a highly sensitive capacitive pressure sensor. ZnO nanowires enhance the dielectric properties and deformability of the composite, allowing for improved capacitance changes under pressure. This nanocomposite design enables wide-range pressure sensing with a low detection limit, making it suitable for touch sensing applications. ZnO is a semiconductor material with tunable electrical properties. When a voltage is applied, current flow through the ZnO nanowire network can generate Joule heating.

The dual-function capacitive touch and heating system may be implemented within the touch sensor layer of an interactive display device. This layer is typically composed of a flexible, transparent substrate embedded with nanowires. The nanowires form a capacitive network that detects touch inputs by sensing changes in capacitance when a conductive object approaches or contacts the surface. In heating mode, the same nanowires generate heat through resistive heating, which can be controlled by adjusting the electrical current supplied to the layer. Such a system is designed to operate with a time-multiplexing technique that allows the system to switch rapidly between capacitive touch sensing and heating so that the separate functionalities do not interfere with each other and operate without perceptible delays. The microcontroller within the device manages this switching process and adjusts the heating power to maintain the desired temperature across the surface.

(c) The Light Layer

The light layer 18 renders the digital information so that it is viewable on the top surface 11 of the assemblies and devices of the present disclosure. In certain embodiments, the light layer comprises a plurality of light elements or pixels, such as light emitting diodes, e.g., red-green-blue (RGB) or red-green-blue-white (RGBW) light emitting diodes (LED'S), organic LED'S (OLED), or a liquid crystal display (LCD) backlit by any of LEDs, fluorescent or cold cathode fluorescent light, or laser projection. The light layer 18 could also be a digital light processing (DLP) display, or a plasma display. As is known in the art, the light layer may include programmable elements that emit and/or block light to generate images.

According to certain aspects, and as shown in FIG. 2A, the light layer 18b may include a low-profile light guide 18a which may support, focus, and/or resize the light from the individual light elements. As indicated above, the light guide 18a may include lenses positioned over each of the light elements that may diffuse or focus the light from the individual light elements, and/or provide pixel size control for a given LED or OLED bulb size. The lenses will allow smaller LED bulbs to be converted into larger pixels displayed on the surface, and conversely may allow larger LED bulbs to be converted into smaller pixels displayed on the surface.

(b+c) The Active Light Layer

Certain configurations of the disclosed assembly may combine the sensor layer with the light layer. To that end, individual photodiodes in a light element may be configured to further operate in sensing mode or photoconductive mode while other photodiodes operate in emitting mode to render digital information. With reference to FIG. 14, individual light elements may include a plurality of photodiodes. In an exemplary configuration, one of the photodiodes may be a sending photodiode while the remainder may emit light, i.e., emitting photodiodes.

These photodiodes, when operating in photoconductive mode, have the ability to change their electrical resistance in response to being exposed to light of a wavelength equal to or less than the predominant wavelength of light that the photodiode is setup to emit, if connected in emitting mode. For instance, a photodiode that emits light in the infrared spectrum can also detect reflected infrared light and the entire visible light spectrum. When connected to an external voltage, this change in electrical resistance causes a change in current which serves as a signal to a change in the intensity of light being received by the photodiode in sensing mode.

In such a setup, and with reference to FIG. 15A, the photodiode in photoconductive mode can detect the intensity of light and the change in intensity of light that is received onto it by the light emitted by its neighboring photodiodes, which are in emitting mode and are part of the same individual light element. This light would be reflected from the interior surface of the non-transparent surface material, such as when an object is positioned over that portion of the surface (see for examples FIGS. 15B-15D). In such a configuration, when an object, whether electrically conductive (see user's finger in FIG. 15C) or electrically insulating (see cup and wooden object in FIGS. 15B and 15D, respectively), is placed on the exterior surface of the non-transparent surface material it will cover a given light element either partially or completely. In this case, the intensity of the light that is received on the photodiode, operating in photoconductive mode, from reflection of the original light that was emitted by the emitting photodiodes of that same light element after reflection by the interior of the non-transparent surface will increase since the object on the exterior surface of the non-transparent surface layer will help in reflecting more light back towards the light element. This change in intensity of light being received onto the photodiode operating in photoconductive mode will cause a change in electrical resistance of the photodiode in photoconductive mode, which will be sent over as a signal to the processor indicating that an object is covering the given light element, i.e., indicating the presence of an object on the exterior surface of the non-transparent layer. This configuration allows the system to differentiate between the presence and absence of objects, such as a human finger or a cup, plate, phone etc. on the non-transparent surface.

The ability of the photodiodes to operate in photoconductive mode is particularly advantageous because it allows the same hardware components used for light emission to be repurposed for light detection. This dual functionality allows for applications of the disclosed interactive display surface wherein touch input is required, without using a capacitive touch sensor and hence also without an insulation layer, thereby allowing for the device to be made much thinner and increasing the brightness and clarity of the digital information rendering on the exterior side of the non-transparent surface (FIGS. 17A-17D). This dual functionality of the photodiodes can be further combined with a capacitive touch sensor to differentiate between touch events by electrically conductive materials and non-electrically conductive materials (FIGS. 15A-15D). In this configuration, the system may include the insulation layer (see FIGS. 16A-16D) or a light guide, i.e., an insulation layer comprising lenses (see FIGS. 15A-15D)

In systems where the light elements are arranged in a grid pattern, each light element can be individually powered and controlled, allowing for precise localization of the sensed input. A practical example of such an application is a restaurant table with a built-in interactive display surface that recognizes when a plate is covering a portion of the display area and can adapt to render the digital information in a way that would avoid it being covered by the plate.

(d) The Insulation Layer

The buffer or insulation layer 16 serves to isolate electromagnetic interference from the light layer 18, thus preventing false readings at the sensor layer 14. This layer may be comprised of transparent or semitransparent polymers including polycarbonate, acrylic resins or epoxies, polyethylene terephthalate (PET or PETE) or polyethylene terephthalate glycol (PETG), polyesters or copolyesters, and polyvinyl chloride (PVC). Glass or silicon-based products such as soda-lime glass, crystal glass, cast or extruded glass fibers, sapphire, borosilicate glass, glass ceramic, quartz and quartz glass, and aluminosilicate glass.

A thickness of the insulation layer 16 may be determined by the density of light elements on the light layer 18. For example, the insulation layer 16 may have a thickness that is at least equal to or greater than 0.25× the pixel pitch of the light layer 18, e.g., pitch of the light elements in the light layer. In a specific example, an assembly comprising a light layer formed with LEDs positioned in a grid with a pitch of 2 mm would include an insulation layer that is at least 0.5 mm thick, such as 1.0 mm thick, or 2 mm thick, or greater. Alternatively, the insulation layer may have a thickness that is not linked to the pixel pitch, i.e., pitch of the light elements on the light layer, and may thus have a thickness that is determined by the material of the layer, and the ability of that material to block electromagnetic interference (EMI).

The insulation layer 16 may further include lenses positioned over individual light elements or pixels that may focus or diffuse light from the light elements, such as shown in FIG. 7A (i.e., acting as a light guide 18*a* and insulation layer 16) wherein the insulation layer 16 includes a grid of lenses 19. As shown in FIG. 7B, which is an enlargement of detail B from FIG. 7A, and FIG. 7C, the lenses 19 may be formed as depressions in the insulation layer that focus the light from the individual light elements or pixels. Such depressions may be thermoformed or milled and may assist in refocusing light diffused by passage through the non-transparent surface layer, and/or by passage through the lower regions of the insulation layer and the sensor layer.

Alternatively, the lenses may be formed as protrusions on the insulation layer, such as thermoformed or bonded on the insulation layer, and may diffuse the light from the light from the individual light elements or pixels.

(e) The Support Layer

A base structural or support layer 20 is included to provide rigidity to the system, and generally forms the bottom surface of the interactive display device. The support layer

20 may include a recess formed therein to accommodate the microcontroller, such that the microcontroller is positioned between the support layer and the light layer.

The support layer may be a metal such as any of an aluminum or aluminum alloy, an iron or iron alloy, steel or steel alloys, magnesium or magnesium alloys, titanium or titanium alloys, zinc or zinc alloys, nickel or nickel alloys, and copper or copper alloys.

The support layer may also be a polymer or resin, such as any of nylon, polycarbonate, high density polyethylene, polyurethane, acetal, polyester, PMMA, phenolic, and cellulose resins.

The support layer may be a composite material laminated with any of an epoxy or epoxy resin, a polyester resin, a carbon fiber, fiberglass, silicon, concrete, porcelain, earthenware, stoneware, natural or synthetic fibers or fabrics, natural or synthetic paper or boards, alumina, silicon nitride, tungsten carbide, zirconia, silicon carbide, or boron carbide. The support layer may be a material such as "Corian" and the like.

The support layer may be a wood or wood-based material, such as hardwoods or softwoods (see for example any of the wood materials listed hereinabove for the surface layer), plywood, low or medium or high-density fiberboard (LDF, MDF, HDF), or particleboard. The support layer may be an environ panel or the like consisting of soy based or thermosetting resin or reinforced with natural or synthetic fiber.

The support layer may be glass and silicon-based materials such as soda-lime glass, crystal glass, cast or extruded glass fibers, sapphire, borosilicate glass, glass ceramic, quartz and quartz glass, or aluminosilicate glass.

(f) Bonding Agents

Various layers of the assembly may be bonded together by a bonding agent that allows for the adhesion of layers and transmission of light. Depending on the layers used, the bonding agent may comprise any of an epoxy or epoxy resin, a polyurethane, a urethane, a urethane acrylate ester, an acrylic, a silicone, a polyvinyl acetate, a cyanoacrylate, natural rubber, gum mastic, gum arabic, and so-called "plastic cements" such as dichloromethane (DCM or methylene chloride) and the like.

The sensor layer may be bonded to the non-transparent surface layer. Additionally, other layers may be bonded, such as the support layer to the light layer, the light layer to the insulation layer, or in certain embodiments to a light guide when included. The insulation layer, or light guide when included, may be bonded to the sensor layer, etc. thus formed, the assembly becomes a rigid, self-supporting device that may be easily integrated within, and even form a structural component of, walls, floors, doors, panels, furniture, and any of the other articles disclosed herein.

(g) Wiring, Microprocessor, and Communication

Power may be provided to the various layers and to the microcontroller via standard cables and electrical circuitry (see FIG. 3). For example, the interactive display surface may receive power from a standard wall outlet that is stepped down from 110V to 5V via a power converter. The power converter may be part of the assembly or may be provided exterior to the assembly. Alternatively, the interactive display surface may be powered by a rechargeable battery integrated in the assembly, wherein the battery may include a connector allowing power for recharging functions to be provided from a standard wall outlet.

User interaction with the non-transparent surface layer 12 (i.e., top surface 11) may be controlled via signals sent from the sensor layer to the microcontroller, and signals sent from the microcontroller to the light layer. As shown in FIG. 3, the microcontroller includes a processor (CPU), a graphical processing unit (GPU), memory (RAM), a storage device, and one or more communications modules (Bluetooth and Wi-Fi). Each of the components are interconnected using various buses and may be mounted on a common motherboard or in other manners as appropriate. The processor (CPU and/or GPU) can process instructions for execution within the computing device, including instructions stored in the memory or on the storage device to display graphical information on the light layer.

Various implementations of the digital information displayed on the surfaces described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor (CPU and/or GPU of FIG. 3), which may be special or general purpose, coupled to receive data and instructions from, and to transmit data and instructions to, a storage system, at least one input device, and at least one output device.

The processes and logic flows for the various implementations of the interactive display surfaces described herein can be performed by one or more programmable processors executing one or more computer programs to perform functions by operating on input data, such as from the sensor layer and sensor driver, and generating output, such as to the light driver and light layer (see FIG. 3).

(h) System Software

To provide for interactions with a user described herein, one or more aspects of the disclosure are implemented by specialized software algorithms executed by the microcontroller. At the very least, basic functionality is written to determine x/y coordinates, and to produce several effects with the led output at these coordinates is stored on the memory and executed by the processor of the microcontroller. Additionally, swipe gesture detection can be determined by comparing x or y sensor trips to an array of previously captured data. Gestures can be used to switch between states or functions, or to provide additional functionality within a given program.

As discussed herein, the assembly may be configured to detect an input at a particular location on the interactive display device and pass the input on to an underlying software application. For example, the interactive display device may: (1) detect an input at a particular location on the interactive display device; (2) transmit data related to the input location to a software application; (3) determine, using the software application, whether the input location comprises a module or location specific widget in the software application; (4) send signal from the software application to a controller for the light layer.

(i) AI Models—AI Model for Isolating Electrical Interference

An AI model may be implemented to manage the complexities of electrical interference generated by the active light elements. The AI-driven system may be designed to enhance the accuracy of touch input detection by dynamically analyzing and isolating electrical interference patterns caused by the light elements in the light layer and noticed on the capacitive touch sensor, ensuring that the device responds accurately to genuine touch inputs, even in the presence of overlapping signals from the light layer.

Architecture and Functionality of the AI Model

The AI model may be specifically trained to distinguish between genuine touch inputs and electrical interference caused by the operation of the light elements. The AI model may be trained using the signals provided to the plurality of light elements in the light layer that are in the emitting mode and then use the corresponding input sensed by the capacitive touch sensor in the corresponding location to identify patterns that correlate with interference. The model's training will further account for the different permutations and combinations of lighting states of individual light elements, which in a preferred configuration are RGBW photodiodes, within a given light element, allowing it to recognize how various lighting configurations impact interference patterns. By understanding and adapting to these configurations, the AI model may then dynamically adjust the sensitivity threshold of the touch sensor corresponding to the given location of active light elements, thus mitigating the impact of interference on genuine touch input accuracy.

The model's architecture may be designed to handle the complexities of real-time data analysis. It includes several layers: the input layer receives raw sensor data and light element operation data, which is then processed through hidden layers optimized for spatial and temporal feature extraction. Convolutional Neural Networks (CNNs) may be employed to detect spatial correlations between touch inputs and active light elements, while Recurrent Neural Networks (RNNs) or Long Short-Term Memory (LSTM) networks may manage the temporal sequencing of events, ensuring that time-based patterns of interference are accurately identified. Additionally, a wide range of AI models may be employed to enhance the performance and adaptability of the system, including but not limited to Support Vector Machines (SVMs), Random Forests, Gradient Boosting Machines (GBMs), Autoencoders for anomaly detection, and hybrid models such as Neuro-Fuzzy Systems and Deep Reinforcement Learning. Evolutionary algorithms like Genetic Algorithms and Neuro-evolution may also be used to optimize model parameters dynamically. The AI system may be capable of adapting to various operational conditions, including those presented by different types of non-transparent surface materials.

Data Collection and Training Process

To train the AI model effectively, a comprehensive dataset is collected, encompassing both genuine touch inputs and instances of electrical interference. Data from the touch sensor layer includes signals corresponding to user interactions, while the light layer's data reflects the operational state of each light element. This dataset includes varied configurations of the RGBW photodiodes within each light element, capturing the diverse interference patterns that arise from different lighting combinations. This dataset is then labeled to distinguish between genuine and false touch events, providing a robust foundation for supervised learning.

The AI model may also be trained using semi-supervised learning models. These models can use a small amount of labeled data in conjunction with a larger pool of unlabeled data to improve the model's performance. Techniques such as self-training, where the model iteratively labels the unlabeled data based on its predictions, can also be applied. Additionally, co-training approaches can be used, leveraging different views of the data, such as the touch sensor signals and light element operational data, to mutually enhance the learning process.

Unsupervised learning models may also be applicable, particularly for feature extraction and anomaly detection.

Techniques like clustering (e.g., K-Means, DBSCAN) can group data points with similar characteristics, helping the model to identify common patterns associated with interference. Autoencoders may be employed to detect anomalies by learning a compressed representation of normal operation data and flagging deviations as potential interference.

Feature engineering plays a key role in this process. Signal processing techniques such as Fourier Transform and cross-correlation may be applied to extract meaningful features from the raw data. These features include amplitude, frequency, and temporal patterns, all of which are essential for the AI model to accurately differentiate between touch inputs and interference. The model may then be trained using these features, optimizing its ability to detect interference with high precision.

Real-Time Operation and Adaptation

Once trained, the AI model may be deployed within the processor of the microcontroller, where it operates in real-time. The model will then continuously monitor the signals from the touch sensor layer and the operational data from the light layer, making rapid inferences to determine the presence of interference. When interference is detected, the AI model adjusts the touch sensor's calibration or sensitivity settings instantaneously, ensuring that genuine touch inputs are accurately recognized without delay.

To further enhance its performance, the AI model may incorporate a continuous learning mechanism. This allows the model to adapt to new patterns of interference over time, including those arising from new combinations of RGBW photodiode lighting states, ensuring that it remains effective as the device is exposed to varying operational conditions. The AI model's ability to learn and adapt can be facilitated by periodic updates, which can be delivered wirelessly to the device, ensuring that the system evolves with advancements in AI techniques and user interaction data.

Implementation Optimization

In order to implement the AI model within the environment of a microcontroller, the model may further be optimized for embedded systems by using techniques such as model compression and quantization to reduce its size and computational requirements. This optimization can ensure that the model can operate efficiently within the limited processing power and memory of the microcontroller, without compromising on the accuracy of touch input recognition. Additionally, the AI model will be custom adapted to various non-transparent surfaces, ensuring that the model can accurately detect and isolate interference across different surface types, maintaining reliable touch input recognition irrespective of the material properties.

Latency reduction is another key aspect of the implementation. The AI model may process incoming data and make inferences with minimal delay, ensuring that the user experience remains seamless. The model's inference time will be optimized to be as low as possible, allowing the device to respond to touch inputs in real-time, even as it dynamically adjusts for interference.

Testing and Improvement

The AI model may be designed to evolve over time through ongoing data collection and online learning, where the model updates its parameters based on new data encountered during regular operation. This adaptability is crucial for maintaining the model's effectiveness in diverse environments, where interference patterns may vary significantly.

Field testing plays a role in validating any AI model's performance. To that end, the model may be tested in real-world scenarios, including different lighting conditions, surface materials, and types of user interactions. These tests ensure that the model performs reliably across a wide range of conditions, providing consistent accuracy in touch input recognition. Specific attention will be given to testing the model's adaptability to various non-transparent surface materials, ensuring that it functions effectively regardless of the material composition. User feedback is also integrated into the continuous learning process, allowing the model to refine its detection algorithms and improve over time.

Embodiments of the Interactive Display Surface

According to aspects of the present disclosure, a non-transparent interactive display surface is provided that includes a non-transparent surface layer of 0.5 mm to 5 mm thickness, such as less than 1 mm thick for wood veneers or up to 3 mm thick for plastic veneers. The surface layer is direct contact bonded to a sensor layer, such as capacitive touch sensor layer. Beneath the sensor layer is a substantially transparent insulation layer that is positioned over a light layer, such as formed by a grid of LED light elements. The LED lights may be RGB or RGBW LED's arranged in a grid, such as a grid having a 2 mm pitch. The insulation layer may have a thickness that is linked to a pitch of the light elements on the light layer, and thus may be not less than 1 mm thick, or may be independent of such (i.e., thickness that is determined by the material of the layer, and the ability of that material to block electromagnetic interference (EMI), and not the pitch of the light elements). Finally, a microcontroller may be included in a recess in a support layer that is position below the light layer.

Accordingly, the present disclosure provides for a novel layering of (1) a thin layer of non-transparent veneer, (2) a sensor layer, (3) an insulation layer that provides electromagnetic separation, and (4) a light layer. The present disclosure further provides for a novel layering of (1) a thin layer of non-transparent veneer, (2) a sensor layer, (3) a light guide layer, and (4) a light layer.

These layers are assembled to form an interactive touch screen that can be integrated into a multitude of surfaces in a wide variety of environments and is configured to display digital information. For example, the interactive display surface may be integrated with furniture, such as a table as shown in FIGS. 9A and 9D, a desk as shown in FIG. 9C, or a bedside table as shown in FIG. 9B. As shown in FIGS. 9A-9D, a position of the interactive display device is noted by illumination of all of the light elements of the light layer such that they are depicted as a visible grid. In the passive state, however, the interactive display device would not be visible on the surface of any of these furniture embodiments. Moreover, while shown to be incorporated on only a portion of the furniture surface, since the interactive display device is frameless, the sensor and lighting regions of an integrated surface could extend to edges of that surface (e.g., to one or more edges of the tabletop).

Figure 10A:
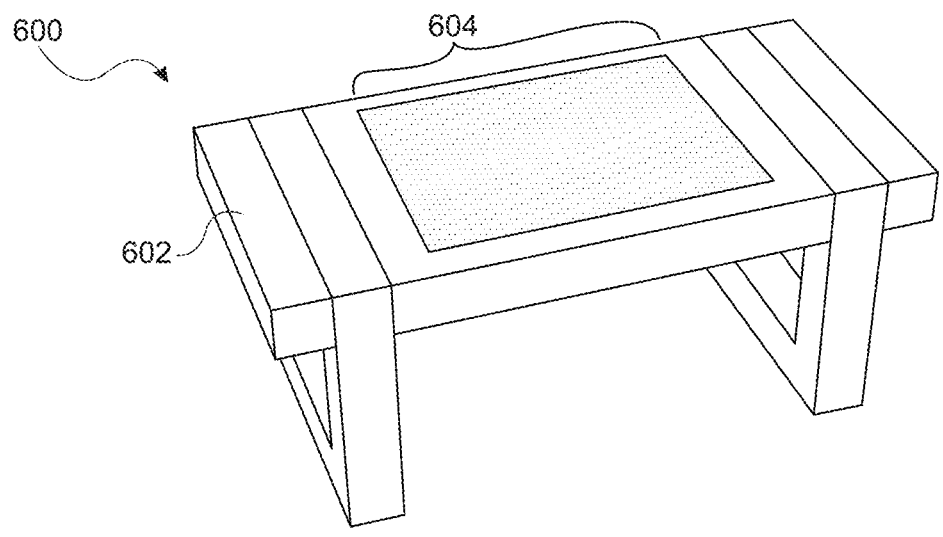
Figure 10B:
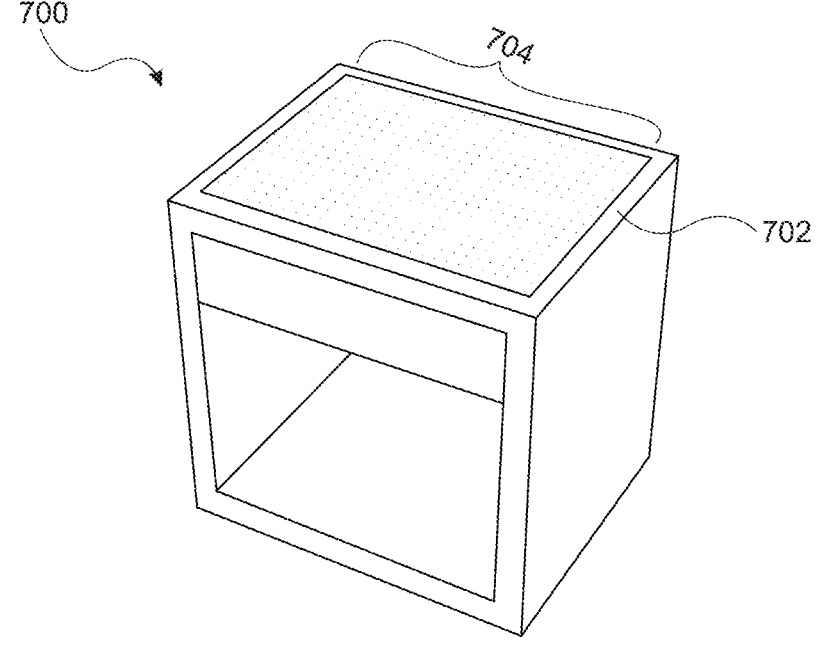
Figure 10C:
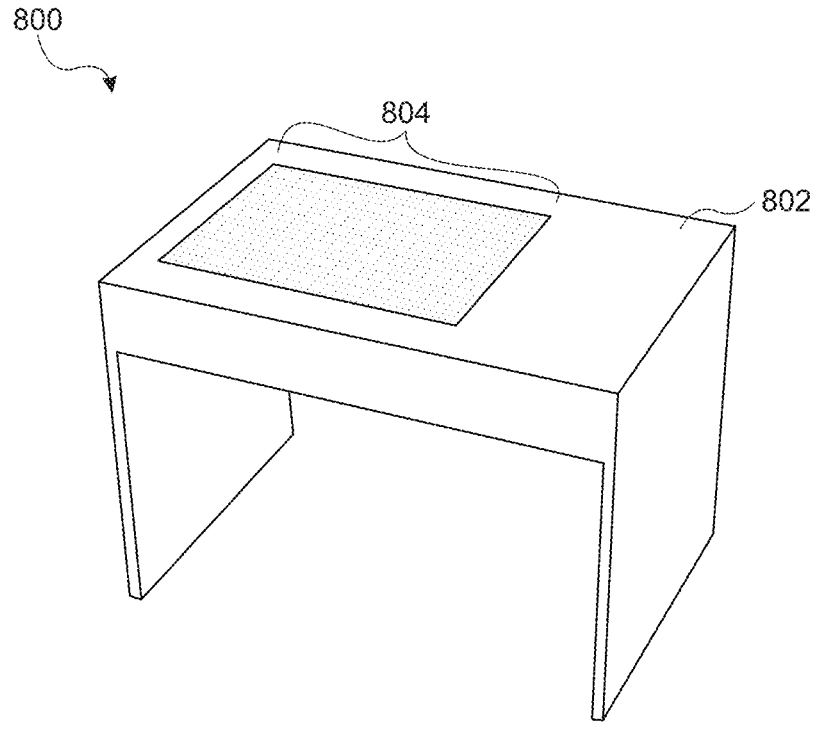
Figure 10D:
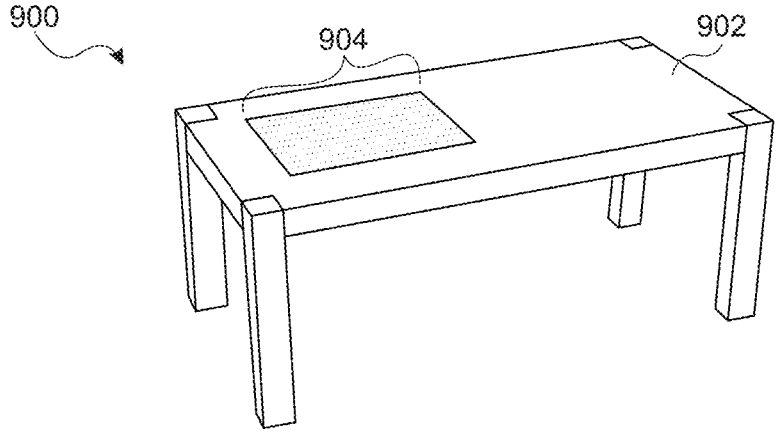

The interactive display surface may be integrated with a table or counter in a retail establishment, such as shown in FIG. 10A, or in a restaurant, such as shown in FIGS. 10B and 12A. The interactive display surface may be integrated with a door, such as shown in FIGS. 11A and 11B, or on panels, such as shown in FIGS. 7A to 8B.

One goal of these interactive display surfaces is to present digital information, such as the weather information 504 shown in graphics and text on the display surfaces 502 of panels 500 in FIGS. 8A and 8B, or the textual weather information (1004', 1104) shown on a surface 1002 of a door 1000 in FIG. 11B or the side 1100 of a kitchen counter in FIG. 13B, respectively. Other information can include daily agendas, such as shown on the surface 1002 of a door 1000 in FIG. 11A (textual information 1004), or menu items or specials, such as shown on the surface 902 of a table 900" in FIG. 10B (textual information 904").

Another goal of these interactive display surfaces is to act as a touchpoint for social connection. That is, the interactive display surface may be configured to provide simple games that two users could play together (e.g., pong, tic-tac-toe) to encourage interpersonal interaction and to nudge behaviors for positive impact (see for example the tables 900a showing digital information 904 in FIG. 13A). There are a wide variety of games that could be provided by the interactive display surface of the present disclosure, which could be used by one or more players.

Another goal of these interactive display surfaces is to provide smart devices. For example, when included on a bedside table, such as shown in FIG. 9B, the interactive display surface could be used as an alarm clock, where its display could gradually intensify brightness at a wakeup time, such as shown in FIGS. 7B and 7C (display 304 or 404 on surfaces 302 or 402, respectively) or display a clock interface.

There are an unlimited number of functionalities or information that can be provided by various embodiments of the devices and methods of the present disclosure. Some non-limiting examples of such functionality and information (gathered and/or provided) include at least raising or lowering the temperature of a connected thermostat, raising or lowering lights, blinds, or volume levels of connected lighting, curtains, or music systems, methods for interacting with staff in retail or service environments (i.e. meal tracker or waitress call in restaurant, etc.).

Additional information that can be gathered, provided, analyzed, and/or displayed include at least health data, such as weight, heart rate, blood sugar levels, workout activities, step counts, calorie counts, activity levels, daily schedules, reminders, to-do lists, meeting requests, bank data, stock levels, water, gas, oil, food, electricity, battery, internet bandwidth consumption levels, air quality, weather data, or other environmental information, recipe information, shopping lists, menus, specials, pricing, or other retail/service information, advertising, social information from other social media or social connection apps, and navigation information.

The devices and methods of the present disclosure can also be used to transfer information to and from other devices. For example, as shown in FIG. 7A, placing a cell phone 2 on a surface with an integrated interactive display surface of the present disclosure may allow transfer of power to the phone, or data to/from the phone, such as notifications, or transfer control of certain phone applications to the display surface. Note the surface 202 of the table 200 on which the cell phone 2 is placed may respond to the presence of the cell phone with a visual display (204, 204').

Further yet, the devices of the present disclosure may also provide unique user interfaces for other electronic devices, such as by displaying a keypad or keyboard for use as an input device allowing entry of a phone number or a text message when connected to a cell phone, or for input of information on a computer, laptop, smart TV, and the like.

The devices and methods of the present disclosure may also provide the ability to train UID (unique identifiers) gestures as a security measure such as for locking and/or unlocking doors, compartments, drawers, and the like.

The potential uses of the devices and methods of the present disclosure are infinite and the examples provided herein are meant to illustrate and not limit the range of surfaces in which the presently disclosed interactive devices, assemblies, and surfaces can be incorporated, e.g., items and/or environments, or the types of digital information that may be displayed. Moreover, in alternative embodiments of the devices and methods of the present disclosure, the interactive display surfaces have additional integrated with voice-activated TOT connectivity (Alexa, Siri, or Google home assistant integration).

The interactive display surfaces disclosed herein may also be provided with an adaptable interface that can serve as a platform for third-party app development, such as nest thermostat control, Apple HomeKit® lighting control, Sonos® music player control, and more.

The interactive display surfaces can also integrate with a variety of other technologies such as speakers and screens (e.g., computer or TV).

The interactive display surfaces can be both embodied in a specialized piece of furniture and as a technology that can be imbued into the built environment in a natural and seamless way, such as within specific specialized environments (e.g., kitchens, offices, elevators, airplane panels, etc.).

The interactive display surfaces provide beneficial use in tables, counters, desks, drawer faces, cabinets, doors, walls, and ceilings, providing users with calm, ambient information at a glance when needed, while minimizing itself into its natural surroundings when not needed. Discussions of specific embodiments and applications of the devices and methods of the present disclosure should be considered to be exemplary illustrations and not limitations on the scope of the present disclosure.

The present disclosure also relates to a method of making surfaces with an integrated touch screen using this novel layering. The following description provides methods of making a touch screen according to the present disclosure.
Exemplary Integrations of the Interactive Display Surface in a Table Tables having an interactive display surface integrated therein may find use in a wide range of environments, several examples of which are provided herein. A work from home solution may allow a user to manage information from devices, reduce distractions, use ambient digital feedback to give the feeling of physical connections, enable deep work through time boxing activities, help maintain healthy habits like drinking water, standing up, switching contexts between different types of work, and may provide a trackpad for mouse and other adaptive digital tools for certain programs. When the table is included in an office or co-working space, the display may provide additional functionality (i.e., in addition to the functionality just described), including collaborative tools such as a digital whiteboard, healthier meeting habits such as helping ensure everyone is heard.

The table may be included as part of a learning environment, such as a school desk, wherein the display may assist in learning and testing activities. For example, the table may assist children in learning colors, shapes, number, letters, language, and may help improve hand eye coordination. The display may allow the user to get creative, such as by drawing on the surface with a finger. The surface may allow tech to be incorporated into the learning environment for young children in a healthy manner.

The table may be a coffee table wherein the surface provides a smart home hub, a series of multiuser games (e.g., pong, air hockey, battleship, chess) and a series of board games with special conductive blocks that dynamically interact with the game (e.g., Monopoly, Catan). The surface lighting may help with meditation and to obtain moments of mindfulness through visual and auditory interactivity.

When integrated in a table within a restaurant, menus and portion sizes may be displayed on the table, and the user may place an order, customize the order, make a payment using a cell phone, split the cheque with others at the table, and may also sense for sanitization-if the table has been wiped down completely after each use. The display may also provide promotional tools, allow for group game play (e.g., group or restaurant wide activities like trivia). Such functionality can also be used in food courts at malls, airports, and movie theaters.
Exemplary Integrations of the Interactive Display Surface in a Panel Panels having an interactive display surface integrated therein may find use in a wide range of environments, several examples of which are provided herein. For example, a panel may provide interactive display of artwork for homes, retail spaces, museums, co-working spaces, airports, bars, nightclubs. A panel may be used for information displays in retail, museums, luxury brand stores; for navigational guidance in public spaces and public transport; and as signage in malls, airports, trains stations, subways, museums, government buildings, and hospitals.
Exemplary Integrations of the Interactive Display Surface in the Built Environment The interactive display surfaces disclosed herein may be integrated into the built environment, such as into a kitchen countertop, where it may provide a wide range of information and functionality, such as measuring ingredients (size estimators), use as a control panel for appliances, use as a prep station, provide views of recipes and instructions, display video tutorials.

The interactive display surfaces may be integrated in a wall to provide control of lights, sounds, temperature, or may be used in conjunction with a mobile phone or other mobile device to provide select controls for phone and tablets like answering a call, controlling the volume, etc.

The interactive display surfaces may be integrated in a door, such as a closet door to display weather and clothing recommendations; a front door to display weather and clothing recommendations (e.g., jacket, umbrella) or transit schedules (bus time, uber arrival) on an interior side, or security access pattern on an exterior side. The interactive display surface may allow users to leave messages about package deliveries on an exterior of a house door or wall, or use as doorbell, or provide signage of a home/apartment number.

The interactive display surfaces may be integrated in an elevator, such as inside the elevator car to replace control panels; or outside the doors of the elevator to integrate call buttons or floor numbers, travel direction.

The interactive display surfaces may be integrated in gyms, such as on a wall to connect with a phone for time blocking activities, workout planning, workout instructions, workout diagrams and flows, or to control music and TV.
Exemplary Integrations of the Interactive Display Surface in Transit Applications The interactive display surfaces may be integrated in a dashboard, such as to provide control information (e.g., navigation, speed, etc.), control of an infotainment system, and control of cabin functionality (e.g., lighting). Such integration may have the further benefit of providing a lower resolution design that is less distracting to the driver. The interactive display surfaces may provide information on public transit systems (e.g., trains, planes, boats, buses), such as maps, seat numbers, lighting, destination, current location, infotainment (e.g., transit wide such as a screen on a boat, or at the seat level), and signage or information relevant to the passenger (e.g., signage inside and/or outside; emergency alerts and directions).

Exemplary Integrations of the Interactive Display Surface in a Robot (i) Human Interaction and Safety Touch-Sensitive Heated Surfaces for Safe Interaction: Robots equipped with touch-sensitive heated surfaces can interact safely and comfortably with humans. For instance, when the robot is lifting heavy objects, specific areas of its body may light up in a warm color to signal to nearby people that they should keep a safe distance. This enhances safety during potentially hazardous tasks.

Enhanced Personal Care: Robots designed to assist with personal care can use these sensors to monitor and adjust their touch during activities like helping an elderly person with mobility or providing assistance during physical therapy. The heating function may be used to warm the robot's hands before it touches a person, making the interaction more pleasant and less mechanical.

Adaptive Response to Human Touch: The touch sensing capability allows the robot to respond to human touch, triggering specific actions like changing its behavior or providing feedback through the interactive display surface. This can enhance the robot's ability to adapt to the needs and preferences of the user.

(ii) Robotic Cleaning and Maintenance

Pressure and Temperature Control for Delicate Cleaning: In cleaning robots, dual-function sensors can be integrated into the cleaning surfaces or tools, allowing the robot to sense and adjust pressure when wiping delicate surfaces like glass. The heating function can help remove stubborn stains by applying gentle heat.

Surface Drying and Sanitization: The heating capability can be used to dry surfaces quickly after cleaning or to provide heat to sanitize areas through thermal exposure, ensuring a higher standard of cleanliness.

(iii) Cooking and Food Preparation Assistance

Precision in Food Handling: For robots involved in kitchen tasks, dual-function sensors can be applied to surfaces that interact with food, such as cutting boards, robotic arms, or cooking utensils. The touch sensitivity allows the robot to handle food items with the right amount of pressure, preventing damage to delicate ingredients.

Heating for Cooking and Food Warming: The heating capability can be used to keep food warm or to cook certain ingredients directly on the robot's surface, offering new possibilities for automation in the kitchen. This dual functionality ensures that the robot can perform complex cooking tasks efficiently and safely Exemplary User Interactions with the Interactive Display Surfaces User Case 1—Bedside Table Integration A bedside table having an interactive display surface integrated therein may allow the user to glide a hand over the table, which may then display a desired wakeup time. This time may be accepted or changed, such as by moving a finger in a clockwise or counterclockwise circle on the tabletop, gradually increasing or decreasing the time, respectively. The user may place a phone on the table, wherein a subtle ring of light glows briefly on the tabletop, surrounding her phone, indicating that it is connected, and charging wirelessly. Through additional data interaction between the table and the phone may cause the phone to automatically turn on "do not disturb" mode, e.g., as it senses contact with the table. An additional or different hand motion over the edge of the table may then shut off the light, i.e., a separate light connected via the internet or the light provided by the interactive display surface.

The interactive display surfaces on the table may also provide sounds, such as white noise, the sound of a resting heartbeat or one of a dozen soothing sounds or music with 60 bpm, simulating the resting heartbeat, and activating the parasympathetic nervous system. Moreover, the interactive display surface may display a soothing depleted blue spectrum light that may help to disrupt the effects of blue light, such as from computer screens and other standard electronic device screen. This light and/or the sounds may be programmed to dim after one or more time intervals.

When integrated with other devices, table comprising interactive display surface may interface with smart-home devices to regulate room temperature during set hours, e.g., to 60-67 degrees Fahrenheit. At the set wake time, alarm setting, the interactive display surface may gradually light the room with a blue light that alerts and stimulates the brain, progressively waking the user. Alternatively, or additionally, the interactive display surface may pulse the light and start sounds or music, such as after the light has reached a certain brightness level.

The interactive display surface may also display information such as the time, date, room temperature, weather, the day's schedule, alerts, and/or news events, etc.

The described embodiment of the interactive display surface may (1) help stimulate the parasympathetic nervous system, (2) provide a progressive awakening function, (3) provide weather information at a glance, (4) allow control of household environmental controls or music player controls (though Homekit®, nest, or Sonos® API integration), all while functioning as a table having a beautiful surface, such as a wood veneer.

User Case 2—Coffee Table Integration

A coffee table having an interactive display surface integrated therein may allow the user to tap, slide, or hold a fingertip against the tabletop in various locations to cause rippling color effects to move, grow, and shift from within the table's surface. The interactive display surface may remember the last sequence performed, allowing the user to create a visual pattern that may be continually produced as an ambient display on the table surface. Such a visual pattern may also be created based on a music beat, key, scale, or pattern.

The interactive display surface may also display a range of functionalities. For example, should the user desire to play an interactive game, they may swipe a hand across the interactive display surface to display several different modes, wherein a game mode may be selected with a contact point on the graphic (e.g., touch the desired option). Other functionality may include control of lighting, music volume, room temperature, etc., such as through integration of the surface with Homekit®, nest, or Sonos®.

While most of the embodiments discussed thus far have been personal or residential in nature, it will be obvious to one skilled in the art that the devices and methods of the present disclosure have limitless applications in commercial and business environments as well. In fact, the interactive display surfaces can be incorporated into almost any environment imaginable where a touch screen device would be of use. The interactive display surfaces can be incorporated into retail display furniture and signage to enable interested consumers into obtaining more information on an item without cluttering the environment with information that might not be necessary for all consumers. The interactive display surfaces can be used on hanging panels, cabinet doors, residential and commercial doors, appliances, etc. In any environment to provide a touch screen that blends esthetically with its environment and provides information and ambient lighting on demand instead of continuously without necessitating the use of a glass touch screen surface.

What is claimed is:

1. An interactive display device comprising:
a non-transparent surface layer;
a light layer arranged on an underside of the non-transparent surface layer and comprising a plurality of light elements configured to render digital information and sense for touch and proximity inputs;
a support layer arranged beneath the light layer and forming the bottom surface of the device; and
a microcontroller supported in a recess within the support layer or mounted on a surface of the device, the microcontroller having a processor configured to execute computer-executable instructions, a memory storing the computer-executable instructions, and a wireless transceiver circuit in communication with the processor,
wherein the light layer and the plurality of light elements are not visible through the non-transparent surface layer when the light layer is inactive and the digital information from the plurality of light elements become visible through the non-transparent surface layer when the light layer is active, and
wherein each light element of the plurality of light elements individually comprises photodiodes, wherein a photodiode having the longest wavelength is configured to operate in sensing mode (sensing photodiode) and remaining photodiodes are configured to operate in emitting mode (emitting photodiodes),
wherein the emitting photodiodes are configured to render the digital information,
wherein the sensing photodiode senses light intensity emitted by the emitting photodiodes that is reflected back to the sensing photodiode by the underside of the non-transparent surface layer thereby providing touch and proximity sensing, and differentiating between the presence and absence of objects placed a top surface of the non-transparent surface layer opposite from the underside thereof, wherein the objects are conductive or non-conductive,
wherein the processor is configured:
to receive input signals from the sensing photodiode in each of the individual light elements to determine the presence and position of objects proximate to or placed on the top surface of the non-transparent surface layer and generate responsive output signals to the emitting photodiodes in each of the individual light elements corresponding to digital information to be rendered on the light layer and visible through the non-transparent surface layer,
monitor operation of the plurality of light elements and detect electrical interference generated by active light elements,
use an AI model to distinguish between genuine touch inputs and the electrical interference caused by the active light elements,
relay information about the active light elements to the touch sensor to dynamically adjust a sensitivity or calibration settings of the touch sensor to isolate the electrical interference from the genuine touch inputs.

2. The device of claim 1, wherein the non-transparent surface layer comprises a material selected from the group consisting of wood, fiber, stone, leather, Corian®, Quartz®, polymers, elastomers, epoxy resin, polyurethane, polystyrene, hydrogels, silicone, rubber, ceramics, alloys, vinyl, opaque acrylics, plastics, and composite materials.

3. The device of claim 1, wherein the plurality of light elements are arranged in a grid having a pitch of 0.25 mm to 5 mm and are selected from the group consisting of:
a) red-red light emitting diode (R-R LED),
b) infrared-red light emitting diode (IR-R LED),
c) red-green light emitting diode (RG LED),
d) infrared-red-green light emitting diode (IR-RG LED),
e) red-blue light emitting diode (R-B LED),
f) infrared-blue light emitting diode (IR-B LED),
g) red-white light emitting diode (RW LED),
h) infrared-white light emitting diode (IR-W LED),
i) infrared-infrared light emitting diode (IR-IR LED),
j) red-red-green-blue light emitting diode (R-RGB LED),
k) infrared-red-green-blue light emitting diode (IR-RGB LED),
l) Red-red-green-blue-white light emitting diode (R-RGBW LED),
m) infrared-red-green-blue-white light emitting diode (IR-RGBW LED),
n) infrared-red-green-blue-infrared light emitting diode (IR-RGB-IR LED),
o) infrared-red-green-blue-white-infrared light emitting diode (IR-RGBW-IR LED),
p) organic light emitting diode (OLED), and
q) micro-LEDs.

4. The device of claim 1, comprising:
a frameless outer perimeter,
wherein the plurality of light elements extend to the outer perimeter, and
wherein each of the plurality of light elements is independently powered and controlled.

5. An interactive display device comprising:
a touch sensor layer;
a light layer comprising a plurality of light elements configured to render digital information and sense for proximity inputs;
a substantially transparent insulation layer arranged between the touch sensor and light layers, wherein the insulation layer is a solid layer having no apertures;
a support layer arranged beneath the light layer and forming the bottom surface of the device; and
a microcontroller supported in a recess within the support layer or mounted on a surface of the device, the microcontroller having a processor configured to execute computer-executable instructions, a memory storing the computer-executable instructions, and a wireless transceiver circuit in communication with the processor,
wherein the touch sensor layer comprises a conductive material arranged on a top surface of the insulation layer,
wherein the device is configured to be positioned directly beneath a non-transparent surface layer with the touch sensor layer proximate to a bottom surface of the non-transparent surface layer,
wherein the light layer and the plurality of light elements are not visible through the non-transparent surface layer when the light layer is inactive and light from the plurality of light elements become visible through the non-transparent surface layer when the light layer is active, wherein each light element of the plurality of light elements individually comprises photodiodes, wherein a photodiode having the longest wavelength is configured to operate in sensing mode (sensing photodiode) and remaining photodiodes are configured to operate in emitting mode (emitting photodiodes), wherein the emitting photodiodes are configured to render the digital information, and wherein the sensing photodiode senses light intensity emitted by the emitting photodiodes that is reflected back to the sensing photodiode by the underside of the non-transparent surface layer thereby providing touch and proximity sensing, and differentiating between the presence and absence of objects placed a top surface of the non-transparent surface layer opposite from the underside thereof, wherein the objects are conductive or non-conductive, wherein the processor is configured:

to receive input signals from the sensing photodiode in each of the individual light elements to determine the presence and position of objects proximate to or placed on the top surface of the non-transparent surface layer and generate responsive output signals to the emitting photodiodes in each of the individual light elements corresponding to digital information to be rendered on the light layer and visible through the non-transparent surface layer, monitor operation of the plurality of light elements and detect electrical interference generated by active light elements, use an AI model to distinguish between genuine touch inputs and the electrical interference caused by the active light elements, relay information about the active light elements to the touch sensor to dynamically adjust a sensitivity or calibration settings of the touch sensor to isolate the electrical interference from the genuine touch inputs.

6. A piece of furniture having the interactive display device of claim 5 embedded therein, wherein the sensor layer is arranged below and bonded to a non-transparent surface constituting at least a portion of the furniture such that the device blends with the surface when the light layer is inactive, and wherein the interactive display device functions to provide one or more of a learning environment, a smart home hub, a restaurant food menu display, a restaurant food ordering system, a bar menu display, a bar ordering system, a gaming environment, a digital art display, an information display, and a communication device.

7. An architectural element having the interactive display device of claim 5 embedded therein, wherein the sensor layer is arranged below and bonded to a non-transparent surface constituting at least a portion of the architectural element such that the device blends with the surface when the light layer is inactive, and wherein the interactive display device functions as a keypad, security panel, home control panel, interactive whiteboard, digital art display or interactive digital art display.

8. An interior cabin panel of vehicle having the interactive display device of claim 5 embedded therein, wherein the sensor layer is arranged below and bonded to a non-transparent surface constituting at least a portion of the panel such that the device blends with the surface when the light layer is inactive, and wherein the interactive display device provides control information for the vehicle and control of cabin and vehicle control functionality.

9. An appliance having the interactive display device of claim 5 embedded therein, wherein the sensor layer is arranged below and bonded to a non-transparent surface constituting at least a portion of the appliance such that the device blends with the surface when the light layer is inactive, and wherein the interactive display device functions as a control pad to operate the given appliance, keypad, security panel, home control panel, interactive visualizer, interactive whiteboard, digital art display or interactive digital art display.

10. The device of claim 5, comprising:

a frameless outer perimeter, wherein the plurality of light elements extend to the outer perimeter, and wherein each of the plurality of light elements is independently powered and controlled.

11. The device of claim 5, wherein the touch sensor layer comprises a capacitive touch sensor having a plurality of electrodes electrically coupled to the conductive material and spaced apart at predetermined intervals, and an electronic input-output control system configured to receive an input signal from the capacitive touch sensor and generate an output signal responsive thereto that is receivable by a processor, wherein the conductive material comprises at least one of metal nanowires or traces arranged in a grid, and wherein the touch sensor is configured to generate the input signal related to a touch position on the touch sensor layer.

12. A method for providing digital information on a non-transparent surface, the method comprising positioning an interactive display device according to claim 5 below the non-transparent surface.

13. The method of claim 12 wherein the non-transparent surface layer is part of at least one of (a) a piece of furniture, (b) an architectural element, (c) an appliance, or (d) an interior cabin panel of a vehicle.

14. An interactive display device comprising:

a touch sensor layer;

a light layer comprising a plurality of light elements configured to render digital information and sense for proximity inputs;

a substantially transparent insulation layer arranged between the touch sensor and light layers, wherein the insulation layer is a solid layer having no apertures; and a support layer arranged beneath the light layer and forming the bottom surface of the device;

wherein the touch sensor layer comprises a conductive material arranged on a top surface of the insulation layer, wherein the device is configured to be positioned directly beneath a non-transparent surface layer with the touch sensor layer proximate to a bottom surface of the non-transparent surface layer, wherein the light layer and the plurality of light elements are not visible through the non-transparent surface layer when the light layer is inactive and light from the plurality of light elements become visible through the non-transparent surface layer when the light layer is active, wherein each light element of the plurality of light elements individually comprises photodiodes, wherein a photodiode having the longest wavelength is configured to operate in sensing mode (sensing photodiode) and remaining photodiodes are configured to operate in emitting mode (emitting photodiodes), wherein the emitting photodiodes are configured to render the digital information, and wherein the sensing photodiode senses light intensity emitted by the emitting photodiodes that is reflected back to the sensing photodiode by the underside of the non-transparent surface layer thereby providing touch and proximity sensing, and differentiating between the presence and absence of objects placed a top surface of the non-transparent surface layer opposite from the underside thereof, wherein the objects are conductive or non-conductive, wherein the touch sensor layer comprises a capacitive touch sensor having a plurality of electrodes electrically coupled to the conductive material and spaced apart at predetermined intervals, and an electronic input-output control system configured to receive an input signal from the capacitive touch sensor and generate an output signal responsive thereto that is receivable by a processor, wherein the conductive material comprises at least one of metal nanowires or traces arranged in a grid, and wherein the touch sensor is configured to generate the input signal related to a touch position on the touch sensor layer, and wherein the conductive material in the touch sensor layer provides a (i) heating mode that generates heat through Joule heating when a current is applied, wherein the amount of heat generated is controlled by adjusting the current supplied to the nanowires, and (ii) and a touch sensing mode configured to detect touch inputs by forming a capacitive network with a plurality of electrodes, wherein the capacitance is sensitive to proximity or contact of a conductive object.

15. The device of claim 14, configured to rapidly switch between the heating mode and the touch sensing mode, wherein during the heating mode, current is applied to the conductive material to generate heat while temporarily suspending touch sensing, and during the sensing mode, the current is reduced or ceased, allowing the conductive material to function as part of the capacitive touch sensor.

16. A piece of furniture having the interactive display device of claim 14 embedded therein, wherein the sensor layer is arranged below and bonded to a non-transparent surface constituting at least a portion of the furniture such that the device blends with the surface when the light layer is inactive, and wherein the interactive display device along with the dual capacitive touch and heating capability of the capacitive touch sensors functions to provide one or more of a learning environment, a smart home hub, an office desk where the table recognizes a coffee cup and keeps it warm, a restaurant food menu display, a restaurant food ordering system, a restaurant table that recognizes plates and bowls and keeps them warm, a bar menu display, a bar ordering system, a gaming environment, a digital art display, an information display, and a communication device.

17. An architectural element having the interactive display device of claim 14 embedded therein, wherein the sensor layer is arranged below and bonded to a non-transparent surface constituting at least a portion of the architectural element such that the device blends with the surface when the light layer is inactive, and wherein the interactive display along with the dual capacitive touch and heating capability of the capacitive touch sensors functions as a keypad, security panel, home control panel, a kitchen countertop to display recipes and to utilize the heating capability for tasks like bread proofing, interactive whiteboard, digital art display or interactive digital art display.

18. An interior cabin panel of vehicle having the interactive display device of claim 14 embedded therein, wherein the sensor layer is arranged below and bonded to a non-transparent surface constituting at least a portion of the panel such that the device blends with the surface when the light layer is inactive, and wherein the interactive display device provides control information for the vehicle and control of cabin and vehicle control functionality.

19. An appliance having the interactive display device of claim 14 embedded therein, wherein the sensor layer is arranged below and bonded to a non-transparent surface constituting at least a portion of the appliance such that the device blends with the surface when the light layer is inactive, and wherein the interactive display device functions as a control pad to operate the given appliance, keypad, security panel, home control panel, interactive visualizer, interactive whiteboard, digital art display or interactive digital art display.

20. A method for providing digital information on a non-transparent surface, the method comprising positioning an interactive display device according to claim 14 below the non-transparent surface.

21. The method of claim 20, wherein the non-transparent surface layer is part of at least one of (a) a piece of furniture, (b) an architectural element, (c) an appliance, or (d) an interior cabin panel of a vehicle.

* * * * *